(12) United States Patent
Ouderkirk et al.

(10) Patent No.: US 6,565,982 B1
(45) Date of Patent: *May 20, 2003

(54) TRANSPARENT MULTILAYER DEVICE

(75) Inventors: Andrew J. Ouderkirk, Woodbury, MN (US); Laurence R. Gilbert, Marine on the St. Croix, MN (US); Richard R. Dahlen, Shoreview, MN (US); Michael F. Weber, Shoreview, MN (US)

(73) Assignee: 3M Innovative Properties Company, Saint Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/672,691

(22) Filed: Jun. 28, 1996

Related U.S. Application Data

(63) Continuation of application No. 08/494,379, filed on Jun. 26, 1995, now abandoned.

(51) Int. Cl.$^7$ .......................... B32B 15/08; B32B 27/00; G02B 1/04
(52) U.S. Cl. ....................... 428/457; 428/458; 428/480; 428/689; 428/426; 428/430; 359/584; 359/838
(58) Field of Search ................................. 428/457, 458, 428/480, 469, 483, 689, 426, 430; 359/584, 487, 586, 838

(56) References Cited

U.S. PATENT DOCUMENTS

| | | | |
|---|---|---|---|
| 3,124,639 A | 3/1964 | Kahn | ........................ 88/65 |
| 3,276,943 A | 10/1966 | Kawamura | ............... 161/162 |
| 3,514,175 A | 5/1970 | Jenkins | ........................ 350/1 |

(List continued on next page.)

FOREIGN PATENT DOCUMENTS

| | | | |
|---|---|---|---|
| CA | 724101 | 12/1965 | ............... 154/122 |
| CA | 1327286 | 3/1994 | ............. 88/113.18 |
| EP | 062751 | 10/1982 | ............. G02B/1/08 |

(List continued on next page.)

OTHER PUBLICATIONS

"Automotive Glass: Two Approaches to Reducing Heat Load Inside a Vehicle", Malobicky et al, U.S. Glass, Metal, & Glazing, 42(Jul. 1990).

"Coextruded Elastomeric Optical Interference Films", Schrenk et al, SPE Annual Technical Conference, Atlanta, Georgia, 1703 (1988). (No Month).

(List continued on next page.)

Primary Examiner—Deborah Jones
Assistant Examiner—Michael LaVilla
(74) Attorney, Agent, or Firm—Doreen S.L. Gwin; David B. Patchett; Stephen C. Jensen

(57) ABSTRACT

A transparent multilayer device which reflects light in the infrared region of the spectrum while transmitting light in the visible region of the spectrum. The device comprises a multilayered polymer film and a transparent conductor. The multilayered polymer film preferably comprises layers of a semi-crystalline naphthalene dicarboxylic acid polyester having an average thickness of not more than 0.5 microns and layers of a second polymer having an average thickness of not more than 0.5 microns. The layers of semi-crystalline naphthalene dicarboxylic acid polyester preferably have a positive stress optical coefficient. The transparent conductor comprises at least one layer containing a metal or a metal compound in which the metal compound is preferably selected from the group consisting of metal oxides, metal alloys, and combinations thereof. Silver and indium tin oxide are particularly preferred transparent conductors. The transparent multilayer devices may be applied to the surface of a glass or plastic substrate, such as an exterior window in a building, or to a windshield or window in an automobile, truck, or aircraft.

15 Claims, 27 Drawing Sheets

U.S. PATENT DOCUMENTS

| | | | | |
|---|---|---|---|---|
| 3,531,313 | A | 9/1970 | Dates | 117/33.3 |
| 3,565,985 | A | 2/1971 | Schrenk et al. | 264/171 |
| 3,588,216 | A | 6/1971 | Bloom | 350/1 |
| 3,610,729 | A | 10/1971 | Rogers | 350/157 |
| 3,647,612 | A | 3/1972 | Schrenk et al. | 161/165 |
| 3,694,299 | A | 9/1972 | Wagner | 161/45 |
| 3,710,074 | A | 1/1973 | Stewart | 219/203 |
| 3,711,176 | A | 1/1973 | Alfrey, Jr. et al. | 350/1 |
| 3,759,647 | A | 9/1973 | Schrenk et al. | 425/131 |
| 3,773,882 | A | 11/1973 | Schrenk | 264/171 |
| 3,775,226 | A | 11/1973 | Windorf | 161/4 |
| 3,776,805 | A | 12/1973 | Hansen | 161/2 |
| 3,801,429 | A | 4/1974 | Schrenk et al. | 161/181 |
| 3,860,036 | A | 1/1975 | Newman, Jr. | 138/45 |
| 3,935,351 | A | 1/1976 | Franz | 428/34 |
| 3,949,134 | A | 4/1976 | Wildorf | 428/215 |
| 3,990,784 | A | 11/1976 | Gelber | 350/166 |
| 4,069,630 | A | 1/1978 | Chess et al. | 52/172 |
| 4,094,947 | A | 6/1978 | Alfrey, Jr. et al. | 264/171 |
| 4,095,013 | A | 6/1978 | Burger | 428/522 |
| 4,158,718 | A | 6/1979 | Kehl et al. | 428/461 |
| 4,220,066 | A | 9/1980 | Hargreaves et al. | 83/886 |
| 4,226,910 | A | 10/1980 | Dahlen et al. | 428/336 |
| 4,288,493 | A | 9/1981 | Kropp | 428/350 |
| 4,308,316 | A | 12/1981 | Gordon et al. | 428/336 |
| 4,310,584 | A | 1/1982 | Cooper et al. | 428/212 |
| 4,329,396 | A | 5/1982 | Kropp | 428/354 |
| 4,377,613 | A | 3/1983 | Gordon | 428/212 |
| 4,446,305 | A | 5/1984 | Rogers et al. | 528/348 |
| 4,450,201 | A * | 5/1984 | Brill et al. | 428/336 |
| 4,520,189 | A | 5/1985 | Rogers et al. | 528/331 |
| 4,521,588 | A | 6/1985 | Rogers et al. | 528/363 |
| 4,525,413 | A * | 6/1985 | Rogers et al. | 428/212 |
| 4,540,623 | A | 9/1985 | Im et al. | 428/220 |
| 4,590,118 | A | 5/1986 | Yatabe et al. | 428/215 |
| 4,720,426 | A | 1/1988 | Englert et al. | 428/344 |
| 4,756,953 | A | 7/1988 | Utsumi | 428/220 |
| 4,797,308 | A | 1/1989 | Mattin | 428/15 |
| 4,937,134 | A | 6/1990 | Schrenk et al. | 428/213 |
| 4,965,135 | A | 10/1990 | Im et al. | 428/412 |
| 4,971,843 | A | 11/1990 | Michelotti et al. | 428/34 |
| 5,089,318 | A * | 2/1992 | Shetty et al. | 428/212 |
| 5,094,788 | A | 3/1992 | Schrenk et al. | 264/171 |
| 5,094,793 | A | 3/1992 | Schrenk et al. | 264/171 |
| 5,095,210 | A | 3/1992 | Wheatley et al. | 250/339 |
| 5,103,337 | A | 4/1992 | Schrenk et al. | 359/359 |
| 5,122,905 | A | 6/1992 | Wheatley et al. | 359/586 |
| 5,122,906 | A | 6/1992 | Wheatley | 359/586 |
| 5,126,880 | A | 6/1992 | Wheatley et al. | 359/587 |
| 5,149,578 | A | 9/1992 | Wheatley et al. | 28/213 |
| 5,188,760 | A | 2/1993 | Hikmet et al. | 252/299.01 |
| 5,202,074 | A | 4/1993 | Schrenk et al. | 264/241 |
| 5,211,878 | A | 5/1993 | Reiffenrath et al. | 252/299.63 |
| 5,217,794 | A | 6/1993 | Schrenk | 428/220 |
| 5,227,185 | A | 7/1993 | Gobran | 428/426 |
| 5,233,465 | A | 8/1993 | Wheatley et al. | 359/359 |
| 5,234,729 | A | 8/1993 | Wheatley et al. | 428/30 |
| 5,235,443 | A | 8/1993 | Barnik et al. | 359/37 |
| 5,269,995 | A | 12/1993 | Ramanathan et al. | 264/171 |
| 5,278,694 | A | 1/1994 | Wheatley et al. | 359/359 |
| 5,294,657 | A | 3/1994 | Melendy et al. | 524/270 |
| 5,306,547 | A | 4/1994 | Hood et al. | 428/213 |
| RE34,605 | E | 5/1994 | Schrenk et al. | 359/359 |
| 5,316,703 | A | 5/1994 | Schrenk | 264/1.3 |
| 5,319,478 | A | 6/1994 | Fijnfschilling et al. | 359/53 |
| 5,339,198 | A | 8/1994 | Wheatley et al. | 359/359 |
| 5,360,659 | A | 11/1994 | Arends et al. | 428/216 |
| 5,389,324 | A | 2/1995 | Lewis et al. | 264/171 |
| 5,422,756 | A * | 6/1995 | Weler | 359/487 |
| 5,424,119 | A | 6/1995 | Phillips et al. | 428/328 |
| 5,448,404 | A * | 9/1995 | Schrenk et al. | 359/584 |
| 5,451,449 | A * | 9/1995 | Ramakrishna et al. | 428/195 |
| 5,486,935 | A | 1/1996 | Kalmanash | 359/37 |
| 5,486,949 | A * | 1/1996 | Schrenk et al. | 359/498 |
| 5,540,978 | A | 7/1996 | Schrenk | 428/212 |
| 5,552,927 | A | 9/1996 | Wheatley et al. | 359/359 |
| 5,568,316 | A | 10/1996 | Schrenk et al. | 359/584 |
| 5,612,820 | A | 3/1997 | Schrenk et al. | 359/498 |
| 5,629,055 | A | 5/1997 | Revol et al. | 428/1 |
| 5,686,979 | A | 11/1997 | Weber et al. | 349/96 |
| 5,699,188 | A | 12/1997 | Gilbert et al. | 359/584 |
| 5,721,603 | A | 2/1998 | De Vaan et al. | 349/194 |
| 5,744,534 | A | 4/1998 | Ishiharada et al. | 524/442 |
| 5,751,388 | A | 5/1998 | Larson | 349/96 |
| 5,767,935 | A | 6/1998 | Ueda et al. | 349/112 |
| 5,770,306 | A | 6/1998 | Suzuki et al. | 428/328 |
| 5,783,120 | A | 7/1998 | Ouderkirk et al. | 264/134 |
| 5,793,456 | A | 8/1998 | Broer et al. | 349/98 |
| 5,808,794 | A | 9/1998 | Weber et al. | 359/487 |
| 5,825,542 | A | 10/1998 | Cobb, Jr. et al. | 359/487 |
| 5,825,543 | A | 10/1998 | Ouderkirk et al. | 359/494 |
| 5,882,774 | A | 3/1999 | Jonza et al. | 428/212 |

FOREIGN PATENT DOCUMENTS

| | | | | |
|---|---|---|---|---|
| EP | 488544 | A1 * | 11/1991 | |
| EP | 469732 | | 2/1992 | G92B/1/04 |
| EP | 0488544 | | 6/1992 | G02B/5/30 |
| EP | 510919 | | 10/1992 | G02B/5/28 |
| EP | 514223 | | 11/1992 | G02B/5/08 |
| GB | 1015706 | | 1/1966 | |
| GB | 1125709 | | 8/1968 | B44D/5/06 |
| JP | 5-288910 | | 11/1993 | G02B/5/18 |
| JP | 6-11607 | | 1/1994 | G02B/5/18 |
| WO | WO 91/09719 | | 7/1991 | B32B/5/30 |
| WO | WO 95/27919 | | 4/1995 | G02B/27/28 |
| WO | 9517303 | * | 6/1995 | |
| WO | WO 95/17691 | | 6/1995 | G02B/5/30 |
| WO | WO 95/17692 | | 6/1995 | G02B/5/30 |
| WO | WO 95/17699 | | 6/1995 | G02F/1/1335 |
| WO | WO 96/19347 | | 6/1996 | B32B/7/02 |
| WO | WO 97/01440 | | 1/1997 | B32B/27/36 |
| WO | WO 97/01774 | | 1/1997 | G02B/1/10 |
| WO | WO 97/32226 | | 9/1997 | G02B/5/30 |

OTHER PUBLICATIONS

"Coextruded Infrared Reflecting Films", Schrenk et al, 7th Annual Meeting Polymer Processing Society, Hamilton, Ontario, Canada (Apr. 1991).

"Coextruded Iridescent Film", Schrenk et al, TAPPI Paper Synthetics Conference, Atlanta, Georgia (Sep. 1976).

"Coextruded Microlayer Film and Sheet", Im et al, Journal of Plastic Film and Sheeting, vol. 4, 104 (Apr., 1998).

"Coextruded Multilayer Polymer Films and Sheet", Schrenk et al, Chapt. 15, Polymer Blends, vol. 2, 129, Academic Press, Inc. (1978). (No Month).

"Effective Principal Refractive Indices and Column Angles for Periodic Stacks of Thin Birefringent Films", Hodgkinson et al, 1993 Optical Society of America. (No Month).

"Interfacial Flow Instability in Multilayer Coextrusion", Schrenk et al, Polymer Engineering Science, 18 (8): 620 (1978). (No Month).

Multilayers with Wide Transmission Band, Journal Optical Soc. Am. 53(11): 1266 (1963) (No Month).

"New Coatings for Selective Transparent Insulation of Solar Installations", Koltun et al, Geliotekhnika, vol. 10, No. 3, pp. 58–65, 1974. (No Month).

"New Developments in Coextrusion", Schrenk, Advances In Polymer Processing New Orleans, Louisiana, (Apr., 1991).

"Optical Constants of Far Infrared Materials. 3:plastics", Smith et al, Applied Optics, Jun. 1975, vol. 14, No. 6.

"Physical Optics of Iridescent Multilayered Plastic Films", Alfrey et al, Polymer Engineering and Science, Nov. 1969, vol. 9, No. 6.

"Reflectivity of Iridescent Coextruded Multilayered Plastic Films", Radford et al, Dow Chemical Co., American Chemical Society Symposium on "Coextruded Plastic Films, Fibers, Composites", Apr. 9–14, 1972.

"Transparent Heat Mirrors for Passive Solar Heating Applications", Selkowitz, Lawrence Berkeley Lab, U of C. (No date).

"Windows as Luminaries" Evan Mills, IAEEL Newsletter, 3–4/95 (Apr.).

"Big Pane, No Gain" USGOpening, US Glass, Jul. 1995 by Brian Kenedy, pp. 54–57.

"Review of Advanced Glazing Technology and Study of Benefits for the UK" Fenestration 2000–Phase II, Halcrow Gilbert Assoc. Ltd, Feb. 1992.

"Thin–Film Optical Filters" Hugh A. Macleod, published by Adam Hilger Ltd., 1969 (No Month).

"Optical anisotrophy of streched gold island films: experimental results" Kazutaka Baba et al., Optics Letter, vol. 17, No. 8, Apr. 15, 1992, pp. 622–624.

"23.3: Retroreflecting Sheet Polarizer" M.F. Weber, SID 92 Digest, pp. 427–429. (No date).

"P–61: Retroreflecting Sheet Polarizer" M.F. Weber, SID 93 Digest, pp. 669–672. (No date).

Schrenk et al., Nanolayer polymeric optical films, Tappi Journal, pp. 169–174, Jun., 1992.

* cited by examiner

TRANSPARENT MULTILAYER DEVICE

This is a continuation of application Ser. No. 08/494,379 filed Jun. 26, 1995, now abandoned.

BACKGROUND

The present invention relates to optical films useful, e.g., as polarizers or mirrors, or both, which are combined with a transparent conductor to provide good reflectivity in the infrared region of the spectrum while still transmitting visible light.

Light-reflecting devices based upon multiple polymeric layers are known. Examples of such devices include polarizers made of alternating polymeric layers in which the layers have different refractive indices. Use of thin metal layers, such as silver, or a degenerate semiconductor like indium tin oxide, for electrical conductivity effective in the far infrared spectrum is also known. Such metal layers have been combined with dielectric layers to provide effective visible transmission.

SUMMARY

The optical properties and design considerations of birefringent optical films described herein allow the construction of multilayer stacks for which the Brewster angle (the angle at which reflectance of p polarized light goes to zero) is very large or is nonexistent for the polymer layer interfaces. This allows for the construction of multilayer mirrors and polarizers whose reflectivity for p polarized light decreases slowly with angle of incidence, is independent of angle of incidence, or increases with angle of incidence away from the normal. As a result, multilayered films having high reflectivity (for both s and p polarized light for any incident direction in the case of mirrors, and for the selected direction in the case of polarizers) over a wide bandwidth, can be achieved. These multilayered films are combined with a transparent conductor layer, such as silver, to provide broader reflectivity than either the multilayered polymer film or the transparent conductor alone, with the multilayered film providing good near infrared reflection and the transparent conductor providing good far infrared reflection.

Briefly, the present invention includes a multilayered polymer film in which the layers have an average thickness of not more than 0.5 microns. More particularly, in one aspect of the present invention the multilayered polymer film comprises layers of a birefringent polymer, especially a crystalline, semi-crystalline, or liquid crystaline polymer, such as a naphthalene dicarboxylic acid polyester, for example a 2,6-polyethylene naphthalate ("PEN") or a copolymer derived from ethylene glycol, naphthalene dicarboxylic acid and some other acids such as terephthalate ("coPEN"), having an average thickness of not more than 0.5 microns, and preferably with a positive stress optical coefficient, i.e., upon stretching, its index of refraction in the stretch direction increases; and layers of a selected second polymer, for example a polyethylene terephthalate ("PET") or a coPEN, having an average thickness of not more than 0.5 microns. Preferably, after stretching such multilayered polymer films in at least one direction, the layers of said naphthalene dicarboxylic acid polyester have a higher index of refraction associated with at least one in-plane axis than the layers of the second polymer. The film of this invention can be used to prepare multilayer films having an average reflectivity of at least 50% over at least a 100 nm wide band.

Another aspect of the present invention includes a multilayered polymer film comprising layers of a birefringent polymer, especially a crystalline, semi-crystalline, or liquid crystalline polymer, for example a polyester such as PET polymer, having an average thickness of not more than 0.5 microns; and layers of a selected second polymer, for example a polyester or a polystyrene, having an average thickness of not more than 0.5 microns; wherein said film has been stretched in at least one direction to at least twice that direction's unstretched dimension. The film of this invention can be used to prepare multilayer films having an average reflectivity of at least 50% over at least a 100 nm wide band.

The multilayered polymer films used in the present invention are combined with a transparent conductor comprising at least one layer containing a metal or a metal compound in which the latter may be selected from the group consisting of semiconductive metal oxides, metal alloys, and combinations thereof. Preferred transparent conductors include silver, gold, aluminum, copper, and indium tin oxide, with silver and indium tin oxide being particularly preferred. The transparent conductor may be deposited on the multilayered polymer film by conventional means, such as vapor deposition, cathode sputtering, and the like, or it may be a separate metalized polymer or glass sheet that is laminated to the multilayered polymer film, such as by a suitable transparent adhesive. The thickness of the transparent conductor layer that is deposited on or combined with the multilayered polymer film is controlled to achieve the desired reflectivity, the actual thickness depending upon the electrical conductivity of the particular metal, metal alloy, or metal oxide used. The resulting transparent multilayer devices preferably reflect a majority of light in the infrared region of the spectrum while still transmitting sufficient light in the visible region of the spectrum to be transparent, and have a shading coefficient of less than about 0.5.

BRIEF DESCRIPTION OF THE DRAWINGS

The invention will be further explained with reference to the drawings.

DETAILED DESCRIPTION OF ILLUSTRATIVE EMBODIMENTS

Figure 1A:
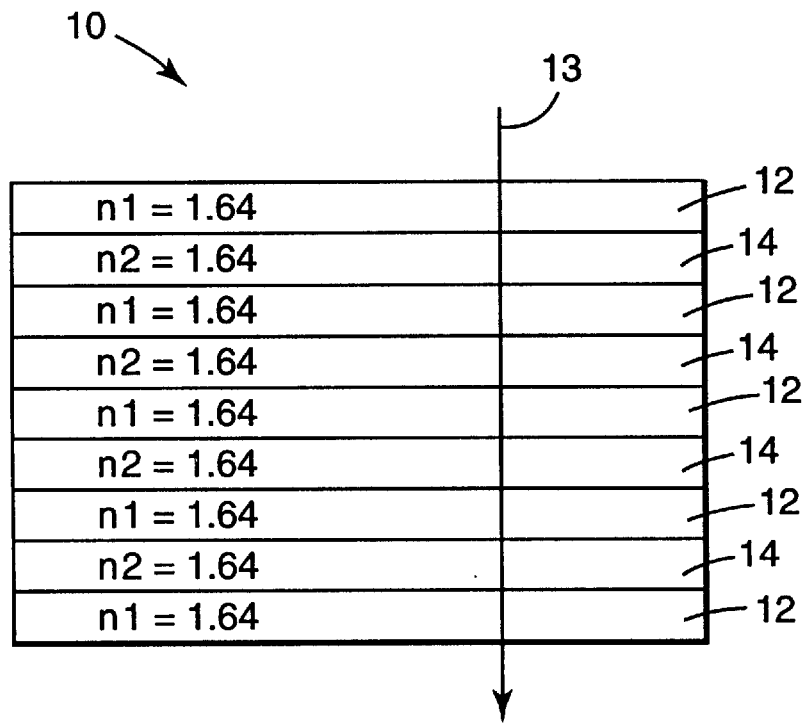
FIGS. 1a and 1b are diagrammatical views of the polarizer of the present invention.
Figure 1B:
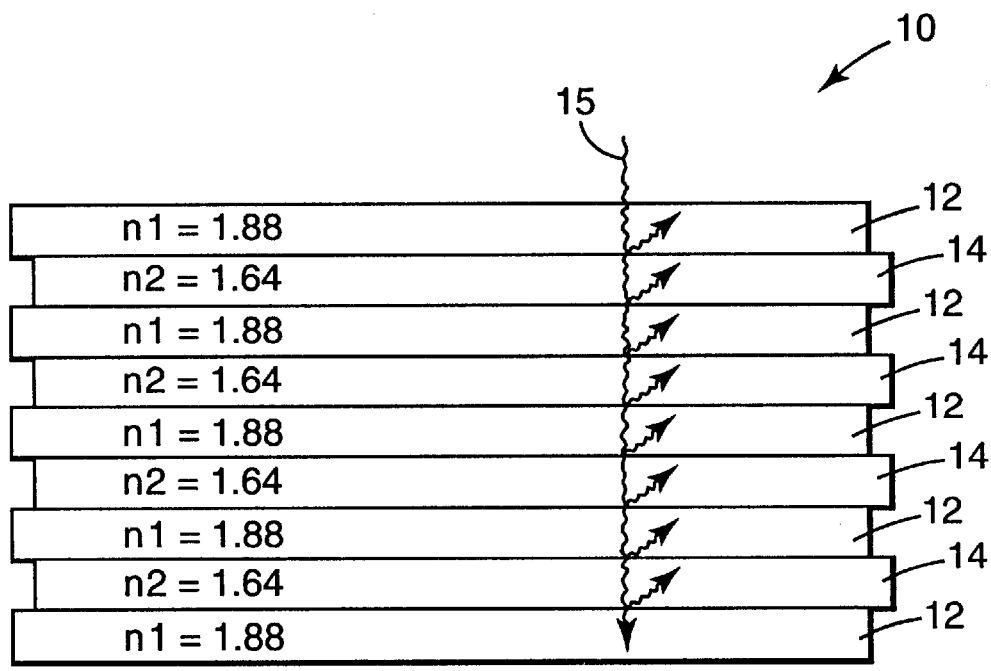

The present invention as illustrated in FIGS. 1*a* and 1*b* includes a multilayered polymer film 10, also referred to herein as a multilayer stack, having alternating layers of at least two materials 12 and 14. Preferably, at least one of the materials has the property of stress induced birefringence, such that the index of refraction (n) of the material is affected by the stretching process. FIG. 1*a* shows an exemplary multilayer stack before the stretching process in which both materials have the same index of refraction. Light ray 13 experiences relatively little change in index of refraction and passes through the stack. In FIG. 1*b*, the same stack has been stretched, thus increasing the index of refraction of material 12 in the stretch direction or directions. The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors. If stretched biaxially, the sheet can be stretched asymmetrically along orthogonal axes or symmetrically along orthogonal axes to obtain desired polarizing and reflecting properties.

The optical properties and design considerations of multilayer stacks is described most completely in copending and commonly assigned U.S. patent application Ser. No. 08/402,041, filed Mar. 10, 1995, the disclosure of which is hereby incorporated herein by reference. Very briefly, that application describes the construction of multilayer stacks (mirrors and polarizers) for which the Brewster angle (the angle at which reflectance goes to zero) is very large or is nonexistent for the polymer layer interfaces. This allows for the construction of multilayer mirrors and polarizers whose reflectivity for p polarized light decreases slowly with angle of incidence, is independent of angle of incidence, or increases with angle of incidence away from the normal. As a result, multilayer stacks having high reflectivity for both s and p polarized light over a wide bandwidth, and over a wide range of angles can be achieved.

Figure 2:
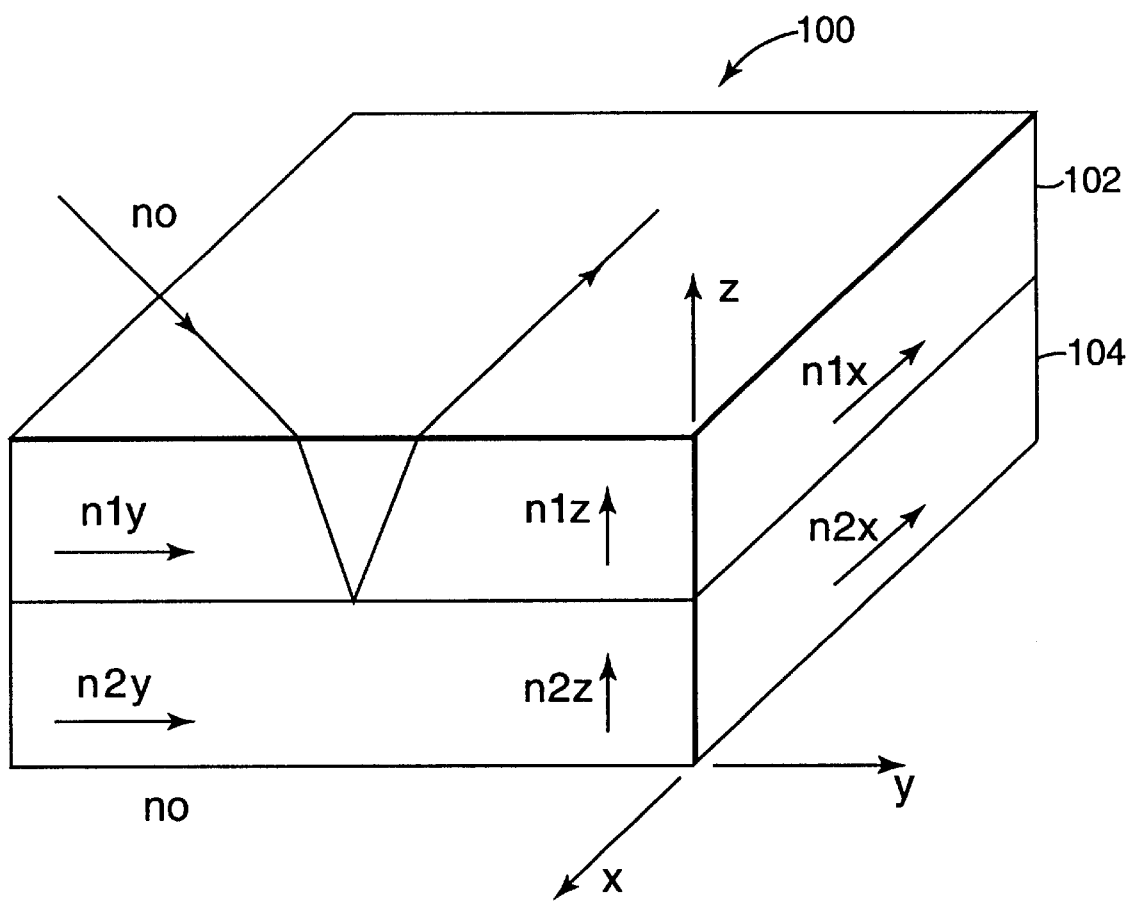
FIG. 2 shows a two layer stack of films forming a single interface.

FIG. 2 shows two layers of a multilayer stack, and indicates the three dimensional indices of refraction for each layer. The indices of refraction for each layer are n1x, n1y, and n1z for layer 102, and n2x, n2y, and n2z for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. patent application Ser. No. 08/402,041 can be applied to create multilayer stacks having the desired optical effects for a wide variety of circumstances and applications. The indices of refraction of the layers in the multilayer stack can be manipulated and tailored to produce devices having the desired optical properties. Many useful devices, such as mirrors and polarizers having a wide range of performance characteristics, can be designed and fabricated using the principles described therein.

Referring again to FIG. 1, the multilayer stack 10 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials. To minimize optical absorption, the preferred multilayer stack ensures that wavelengths that would be most strongly absorbed by the stack are the first wavelengths reflected by the stack. For most clear optical materials, including most polymers, absorption increases toward the blue end of the visible spectrum. Thus, it is preferred to design or "tune" the multilayer stack such that the "blue" layers are on the incident side of the multilayer stack.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks. Preferably, the layers have a ¼ wavelength thickness with different sets of layers designed to reflect different wavelength ranges. Each layer does not have to be exactly ¼ wavelength thick. The overriding requirement is that the adjacent low/high index film pair have a total optical thickness of 0.5 wavelength.

As noted above, the multilayered polymer films used in the present invention include layers that can be made from any number of different materials, including chemically identical materials having different physical properties, which have an average thickness of not more than 0.5 microns. Preferably, the multilayered polymer film comprises layers of a crystalline, semi-crystalline, or liquid crystalline polymer, such as naphthalene dicarboxylic acid polyester having a positive stress optical coefficient, i.e., upon stretching, its index of refraction in the stretch direction increases, and layers of a selected second polymer. After stretching such multilayered polymer films in at least one direction, the layers of the naphthalene dicarboxylic acid polyester preferably have a higher index of refraction associated with at least one in-plane axis than the layers of the second polymer. Particularly preferred semi-crystalline naphthalene dicarboxylic acid polyesters include, for example, a 2,6-polyethylene naphthalate ("PEN") or a copolymer derived from ethylene glycol, naphthalene dicarboxylic acid, and some other acids such as terephthalate ("coPEN"). Particularly, preferred selected second polymers include, for example, a polyethylene terephthalate ("PET") or a coPEN.

The multilayered polymer films alternately may comprise layers of a birefringent polymer, especially a crystalline, semi-crystalline, or liquid crystalline material, for example a semi-crystalline polyester such as PET, and of a second selected polymer in which the layers have an average thickness of not more than 0.5 microns, and the films are stretched in at least one direction to at least twice that direction's unstretched dimension.

When the multilayered polymer films used in the present invention include a crystalline naphthalene dicarboxylic acid polyester, it preferably exhibits a difference in refractive indices associated with different in-plane axes of at least 0.05 and preferably above 0.20. PEN is a preferred material because of its high positive stress optical coefficient and permanent birefringence after stretching, with the refractive index for polarized incident light of 550 nm wavelength increasing when the plane of polarization is parallel to the stretch direction from about 1.64 to as high as about 1.9. The birefringence (difference in refractive index) can be increased by increasing the molecular orientation. Although PEN has been specifically discussed above as the preferred polymer for the birefringent layer, polybutylene naphthalate is also a suitable material as well as other crystalline naphthalene dicarboxylic acid polyesters.

The polymers used to make the multilayer stacks preferably have similar melt viscosities so as to obtain uniform multilayer coextrusion. When two different polymers are used, the two polymers preferably have a melt viscosity within a factor of 5 at shear rates typically experienced in coextrusion. The preferred selected polymer layers of the present invention also exhibit good adhesion properties to each other while still remaining as discrete layers within the multilayered sheet. The glass transition temperatures of the polymers used in the present invention are compatible so adverse effects such as cracking of one set of polymer layers during stretching does not occur. For mirrors which predominantly reflect in one polarization, the preferred selected polymer layer remains isotropic in refractive index and substantially matches the refractive index of the other layer associated with the transverse axis (i.e., an axis orthogonal to the stretch direction and parallel to the plane of the film) as illustrated in FIG. 1a. Light with its plane of polarization in this direction will be predominantly transmitted by the polarizer while light with its plane of polarization in the oriented direction will be reflected as illustrated in FIG. 1b.

To make a mirror, two uniaxially stretched polarizing sheets are positioned with their respective orientation axes rotated 90°, or the sheet 10 (FIG. 1b) is biaxially stretched. In the latter case, both refractive indices in the plane of the sheet for a layer made from PEN increase and the selected polymer should be chosen with as low of a refractive index as possible to reflect light of both planes of polarization. Biaxially stretching the multilayered sheet will result in differences between refractive indices of adjoining layers for planes parallel to both axes, thereby resulting in reflection of light in both planes of polarization directions. Differences between the transverse—axis—associated indices of refraction of adjoining layers after stretching should be less than 0.1 and preferably less than 0.05.

In the case of mirrors, the desired average transmission for light of each polarization and plane of incidence generally depends upon the intended use of the mirror. The average transmission along each stretch direction at normal incidence for a narrow bandwidth mirror across a 100 nm bandwidth within the visible spectrum is desirably less than about 30%, preferably less than about 20% and more preferably less than about 10%. A desirable average transmission along each stretch direction at normal incidence for a partial mirror ranges anywhere from, for example, about 10% to about 50%, and can cover a bandwidth of anywhere between, for example, 100 nm and 450 nm, depending upon the particular application. For a high efficiency mirror, average transmission along each stretch direction at normal incidence over the visible spectrum (380–750 nm) is desirably less than about 10%, preferably less than about 5%, more preferably less than about 2%, and even more preferably less than about 1%. In addition, asymmetric mirrors may be desirable for certain applications. In that case, average transmission along one stretch direction may be desirably less than, for example, about 50%, while the average transmission along the other stretch direction may be desirably less than, for example, about 20%, over a bandwidth of, for example, the visible spectrum (380–750 nm), or over the visible spectrum and into the near infrared (e.g, 380–850 nm).

If desired, two or more sheets of the invention may be used in a composite to increase reflectivity, optical bandwidth, or both, or to form a mirror from two polarizers. If the optical thicknesses of pairs of layers within the sheets are substantially equal, the composite will reflect, at somewhat greater efficiency, substantially the same bandwidth and spectral range of reflectivity (i.e., "band") as the individual sheets. If the optical thicknesses of pairs of layers within the sheets are not substantially equal, the composite will reflect across a broader band width than the individual sheets. A composite combining mirror sheets with polarizer sheets is useful for increasing total reflectance while still polarizing transmitted light. Alternatively, a single sheet may be asymmetrically biaxially stretched to produce a film having selective reflective and polarizing properties.

The preferred selected polymer for use in a biaxially stretched mirror application is based on terephthalic, isophthalic, sebacic, azelaic, or cyclohexanedicarboxylic acid to attain the lowest possible refractive index while still maintaining adhesion to the layers made from, e.g., PEN. It is not required that the selected polymer be a copolyester or copolycarbonate. Preferably, the selected polymer has an index of refraction of less than about 1.65 and more preferably an index of refraction of less than about 1.55.

Multilayer reflecting polarizers can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest. Average transmission at normal incidence for a narrowband polarizer across a 100 nm bandwidth is desirably at least about 50%, preferably at least about 70% and more preferably at least about 90%. The average transmission at 60 degrees from the normal for p polarized light (measured along the transmission axis) for a narrow band polarizer across a 100 nm bandwidth is desirably at least about 50%, preferably at least about 70% and more preferably at least about 80%.

The average transmission at normal incidence for a polarizer in the transmission axis across most of the visible spectrum (400–700 nm for a bandwidth of 300 nm) is desirably at least about 50%, preferably at least about 70%, more preferably at least about 85%, and even more preferably at least about 90%. The average transmission at 60 degrees from the normal (measured along the transmission axis) for a polarizer from 400–700 nm is desirably at least about 50%, preferably at least about 70%, more preferably at least about 80%, and even more preferably at least about 90%.

For certain applications, high reflectivity in the transmission axis at off-normal angles are preferred. The average reflectivity for light polarized along the transmission axis should be more than 20% at an angle of at least 20 degrees from the normal.

The preferred selected polymer for the polarizer of the present invention is a copolyester of the reaction product of a naphthalene dicarboxylic acid or its ester such as dimethyl naphthalate ranging from 20 mole percent to 80 mole percent and isophthalic or terephthalic acid or their esters such as terephthalate ranging from 20 mole percent to 80 mole percent reacted with ethylene glycol. Other copolyesters within the scope of the present invention have the properties discussed above and have a refractive index associated with the transverse axis of approximately 1.59 to 1.69.

Materials Selection and Processing

With the design considerations described in the above mentioned U.S. patent application Ser. No. 08/402,041, one of ordinary skill will readily appreciate that a wide variety of materials can be used to form multilayer mirrors or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar Theological properties (e.g., melt viscosities) such that they can be co-extruded.

In general, appropriate combinations may be achieved by selecting, as the first material, a crystalline, semi-crystalline, or liquid crystalline material, preferably a polymer. The second material, in turn, may be crystalline, semi-crystalline, or amorphous. It should be understood that in the polymer art it is generally recognized that polymers are typically not entirely crystalline, and therefore in the context of the present invention, crystalline or semi-crystalline polymers refer to those polymers that are not amorphous and includes any of those materials commonly referred to as crystalline, partially crystalline, semi-crystalline, etc. The second material may have a birefringence opposite to or the same as that of the first material. Or, the second material may have no birefringence.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g, polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of SPS and atactic polystyrene). The coPEN described may also be a blend of pellets where at least one component is a polymer based on naphthalene dicarboxylic acid and other components are other polyesters or polycarbonates, such as a PET, a PEN or a coPEN.

Particularly preferred combinations of layers in the case of polarizers include PEN/coPEN, polyethylene terephthalate (PET)/coPEN, PEN/sPS, PET/sPS, PEN/Estar, and PET/Estar, where "coPEN" refers to a copolymer or blend based upon naphthalene dicarboxylic acid (as described above) and "Estar" is polycyclohexanedimethylene terephthalate commercially available from Eastman Chemical Co.

Particularly preferred combinations of layers in the case of mirrors include PET/Ecdel, PEN/Ecdel, PEN/sPS, PEN/THV, PEN/coPET, and PET/sPS, where "coPET" refers to a copolymer or blend based upon terephthalic acid (as described above), "Ecdel" is a thermoplastic polyester commercially available from Eastman Chemical Co., and "THV" is a fluoropolymer commercially available from 3M Co.

Figure 16:
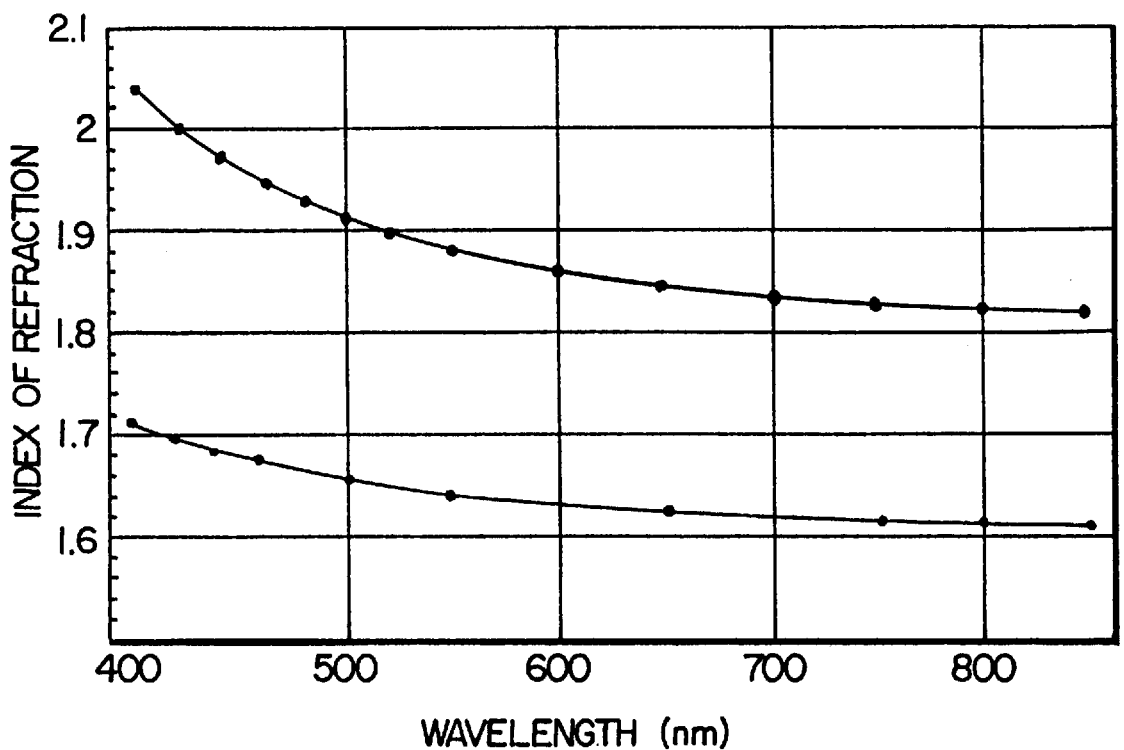
FIG. 16 is a graphical view illustrating the refractive indices characteristics of the PEN and coPEN layers of the present invention.

PEN is a preferred material because of its high positive stress optical coefficient and permanent birefringence after stretching, with the refractive index for polarized incident light of 550 nm wavelength increasing when the plane of polarization is parallel to the stretch direction from about 1.64 to as high as about 1.9. The differences in refractive indices associated with different in-plane axes exhibited by PEN and a 70-naphthalate/30- terephthalate copolyester (coPEN) for a 5:1 stretch ratio are illustrated in FIG. 16. In FIG. 16, the data on the lower curve represent the index of refraction of PEN in the transverse direction and the coPEN while the upper curve represents the index of refraction of PEN in the stretch direction. PEN exhibits a difference in refractive index of 0.25 to 0.40 in the visible spectrum. The birefringence (difference in refractive index) can be increased by increasing the molecular orientation. PEN is heat stable from about 155° C. up to about 230° C. depending upon shrinkage requirements of the application. Although PEN has been specifically discussed above as the preferred polymer for the birefringent layer, polybutylene naphthalate is also a suitable material as well as other crystalline naphthalene dicarboxylic polyesters. The crystalline naphthalene dicarboxylic polyester should exhibit a difference in refractive indices associated with different in-plane axes of at least 0.05 and preferably above, 0.20.

Minor amounts of comonomers may be substituted into the naphthalene dicarboxylic acid polyester so long as the high refractive index in the stretch direction(s) is not substantially compromised. A drop in refractive index (and therefore decreased reflectivity) may be counter balanced by advantages in any of the following: adhesion to the selected polymer layer, lowered temperature of extrusion, better match of melt viscosities, better match of glass transition temperatures for stretching. Suitable monomers include those based on isophthalic, azelaic, adipic, sebacic, dibenzoic, terephthalic, 2,7-naphthalene carboxylic, 2,6-naphthalene dicarboxylic or cyclohexanedicarboxylic acids.

The PEN/selected polymer resins of the present invention preferably have similar melt viscosities so as to obtain uniform multilayer coextrusion. The two polymers preferably have a melt viscosity within a factor of 5 at typical shear rates.

The PEN and the preferred selected polymer layers of the present invention exhibit good adhesion properties to each other while still remaining as discrete layers within the multilayered sheet.

The glass transition temperatures of the polymers of the present invention are compatible so adverse effects such as cracking of one set of polymer layers during stretching does not occur. By compatible is meant that the glass transition temperature of the selected polymer is lower than the glass transition temperature of the PEN layer. The glass transition temperature of the selected polymer layer temperature may be slightly higher than the glass transition temperature of the PEN layer, but by no more than 40° C.

Figure 17:
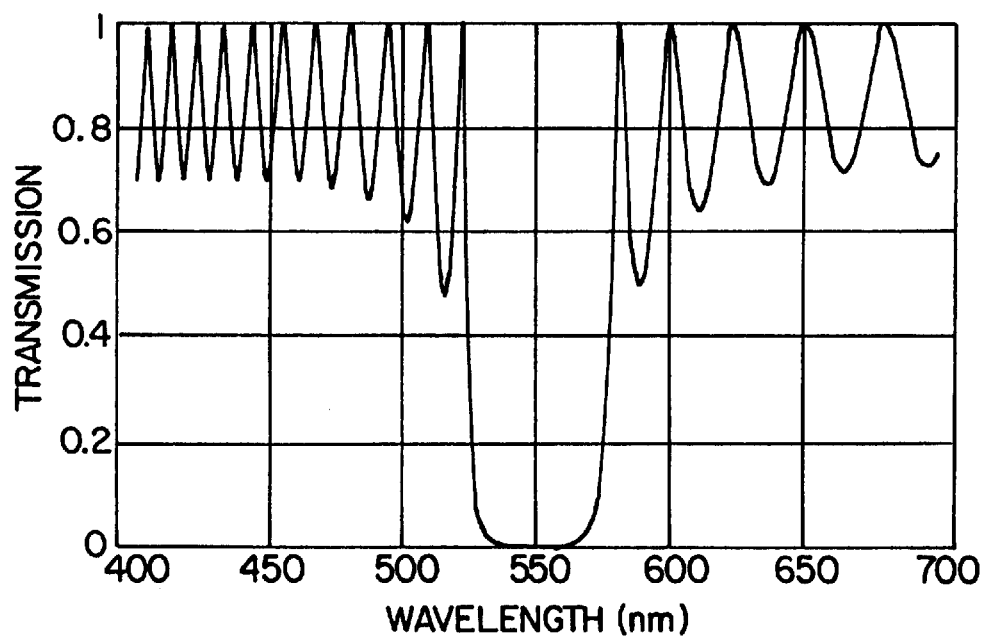
FIG. 17 is a graphical view of computer simulated data of percent transmission of a 50-layer PEN/coPEN film stack based on the indices shown in FIG. 16.
Figure 18:
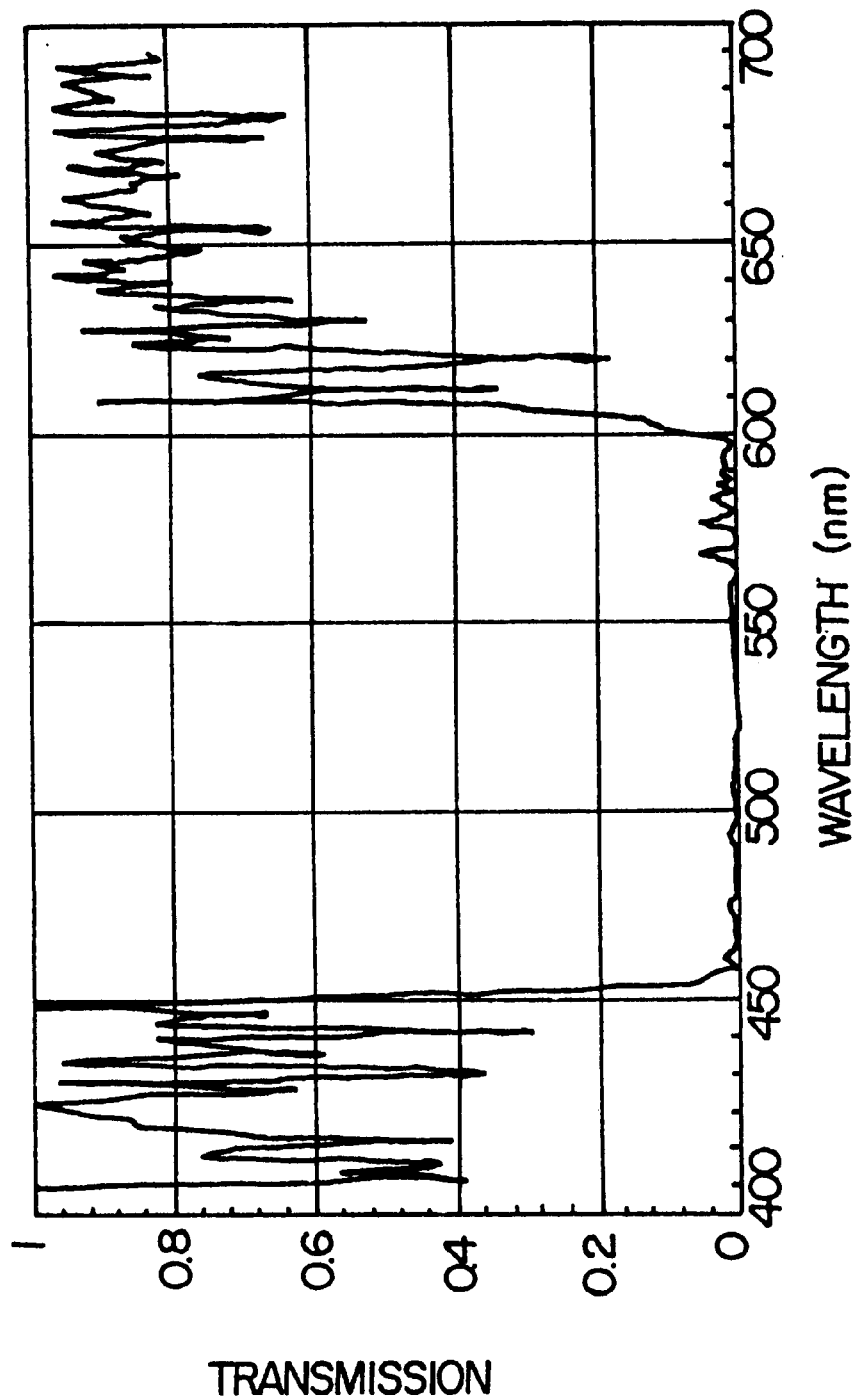
FIG. 18 is a graphical view of computer simulated data of percent transmission of an equally biaxially stretched 300-layer PEN/coPET mirror.
Figure 19:
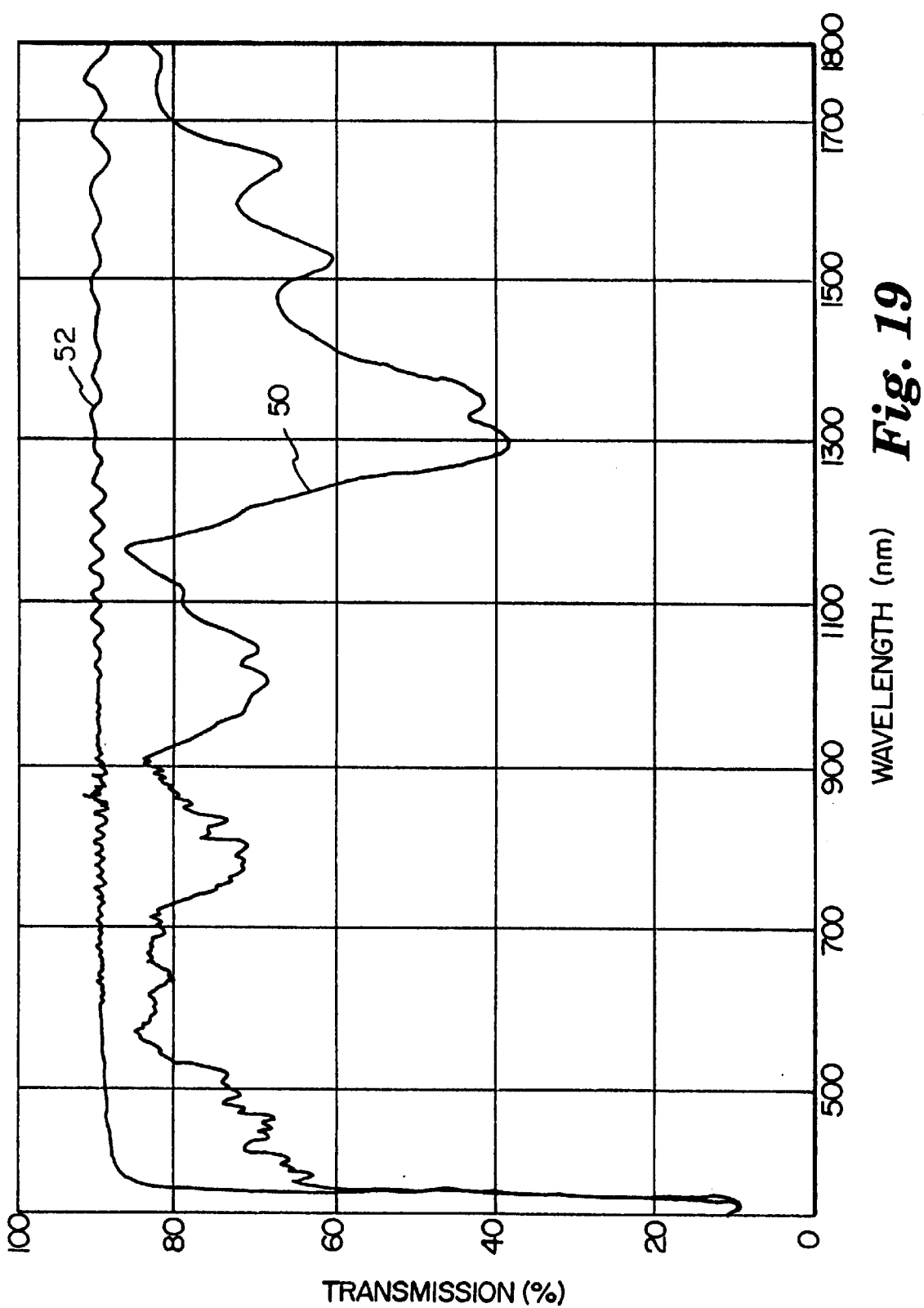
FIG. 19 is a graphical view of percent measured transmission of a 51-layer I.R. polarizer of the present invention with the first order peak near 1,300 nm.
Figure 20:
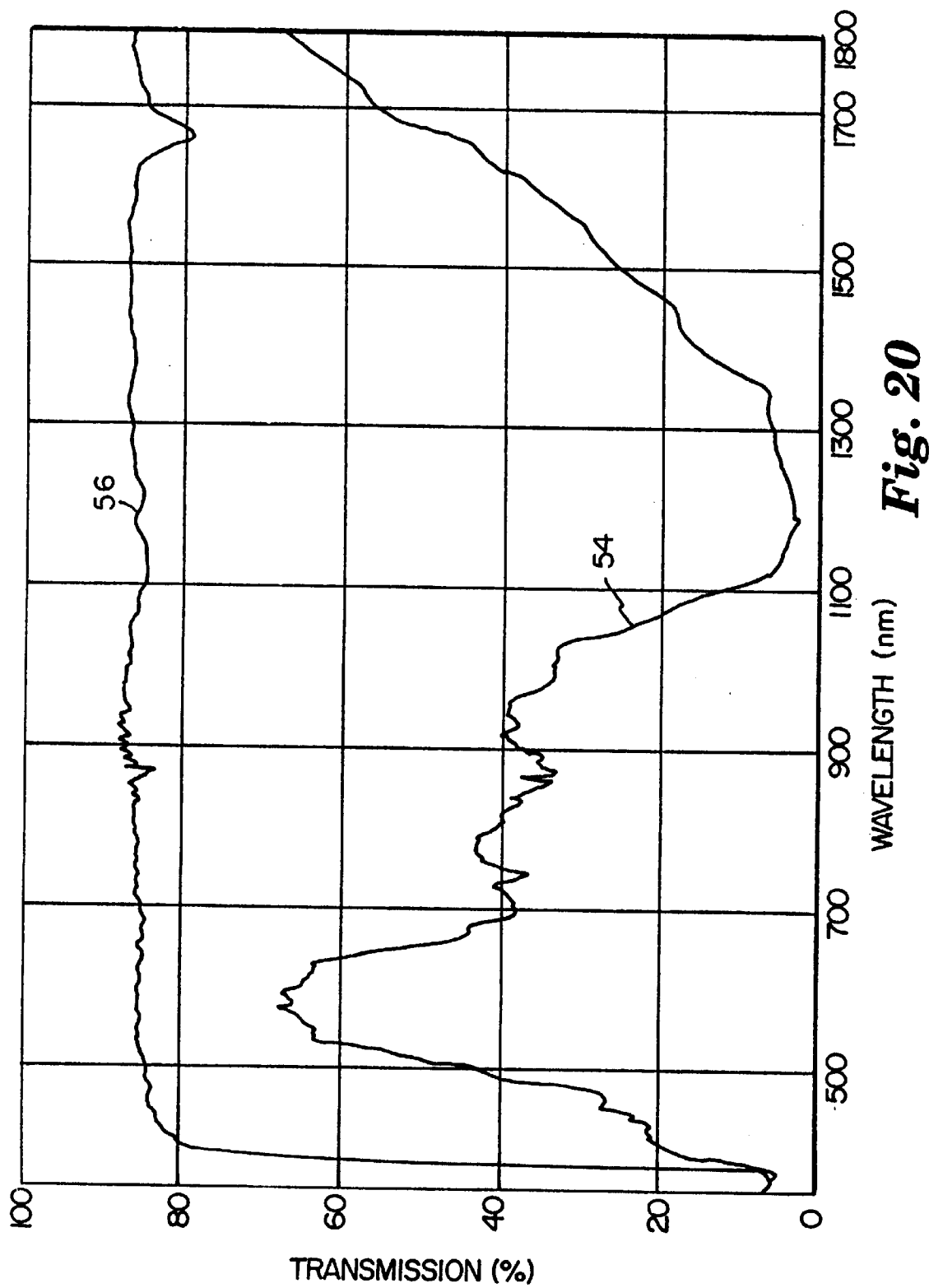
FIG. 20 is a graphical view of percent measured transmission of eight 51-layer polarizers of the present invention laminated together.
Figure 21:
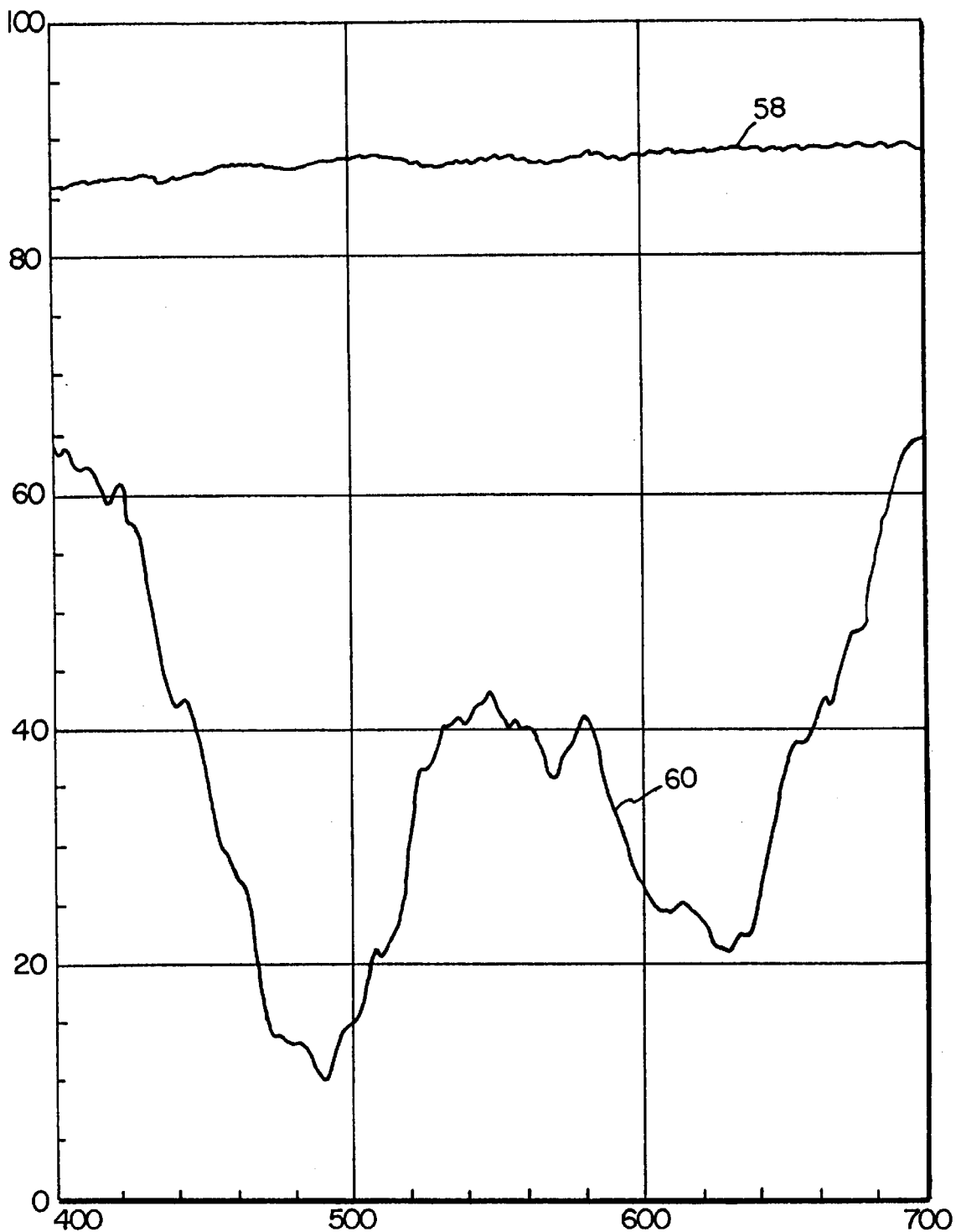
FIG. 21 is a graphical view of percent measured transmission of a 204-layer polarizer of the present invention.
Figure 22:
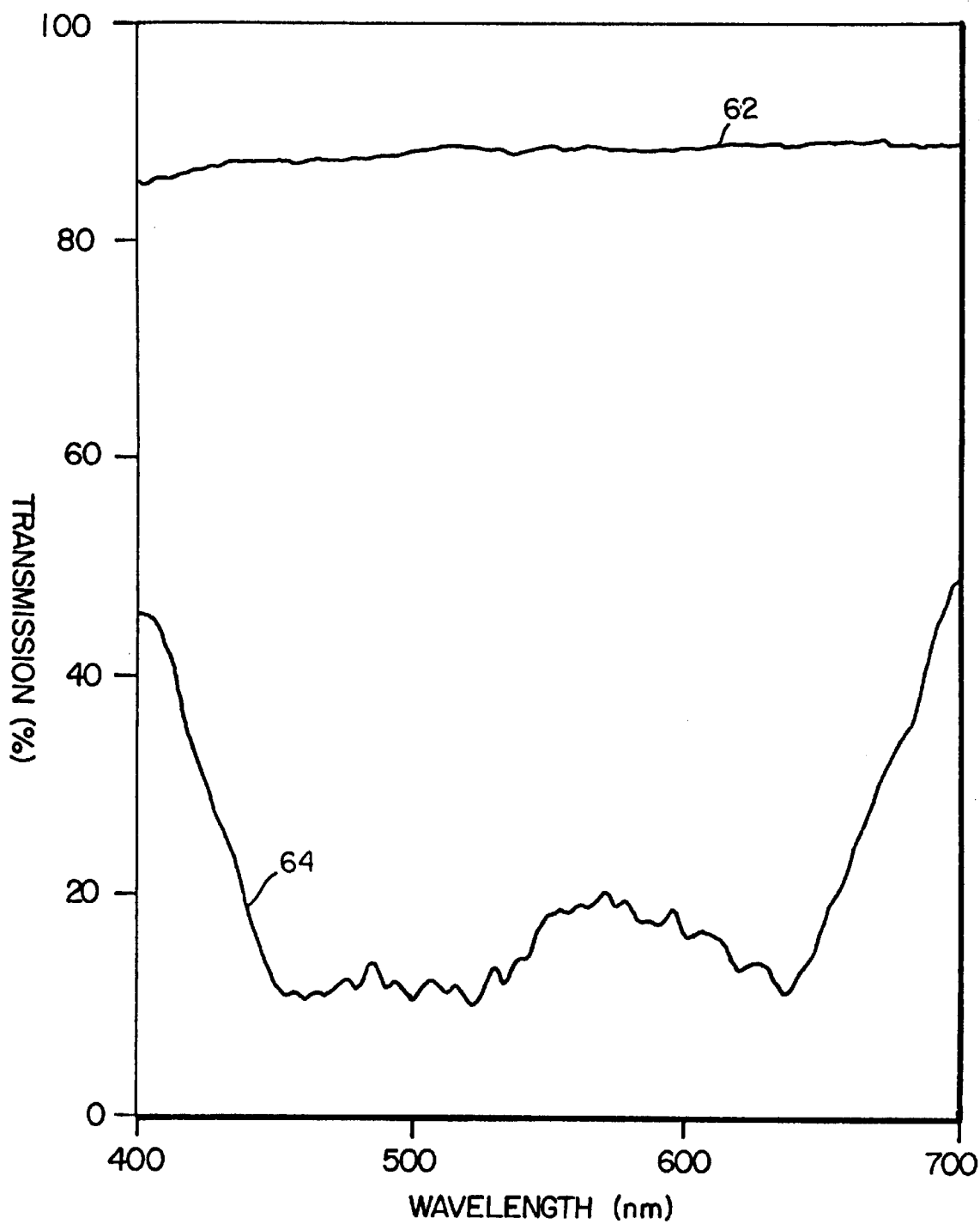
FIG. 22 is a graphical view of percent measured transmission of two 204-layer polarizers of the present invention laminated together.

Preferably, the layers have a ¼ wavelength thickness with different sets of layers designed to reflect different wavelength ranges. Each layer does not have to be exactly ¼ wavelength thick. The overriding requirement is that the adjacent low-high index film pair have a total optical thickness of 0.5 wavelength. The bandwidth of a 50-layer stack of PEN/coPEN layers having the index differential indicated in FIG. 16, with layer thicknesses chosen to be a ¼ wavelength of 550 nm, is about 50 nm. This 50-layer stack provides roughly a 99 percent average reflectivity in this wavelength range with no measurable absorption. A computer-modeled curve showing less than 1 percent transmission (99 percent reflectivity) is illustrated in FIG. 17. FIGS. 17–22 include data characterized as percent transmission. It should be understood that since there is no measurable absorbance by the film of the present invention that percent reflectivity is approximated by the following relationship:

100−(percent transmission)=(percent reflectivity).

The preferred selected polymer layer 14 remains isotropic in refractive index and substantially matches the refractive index of the PEN layer associated with the transverse axis as illustrated in FIG. 1a. Light with its plane of polarization in this direction will be predominantly transmitted by the polarizer while light with its plane of polarization in the oriented direction will be reflected as illustrated in FIG. 1b.

The number of layers in the device is selected to achieve the desired optical properties using the minimum number of layers for reasons of film thickness, flexibility and economy. In the case of both polarizers and mirrors, the number of layers is preferably less than about 10,000, more preferably less than about 5,000, and (even more preferably) less than about 2,000.

As discussed above, the ability to achieve the desired relationships among the various indices of refraction (and thus the optical properties of the multilayer device) is influenced by the processing conditions used to prepare the multilayer device. In the case of organic polymers which can be oriented by stretching, the devices are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of mirrors the film is stretched substantially in two directions (biaxial orientation).

The film may be allowed to dimensionally relax in the cross-stretch direction from the natural reduction in cross-stretch, (equal to the square root of the stretch ratio) to being constrained (i.e., no substantial change in cross-stretch dimensions). The film may be stretched in the machine direction, as with a length orienter, and/or in width using a tenter.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer device. In general, however, a stretch ratio in the range from about 1:2 to about 1:10 (more preferably about 1:3 to about 1:7) in the stretch direction and from about 1:0.2 to about 1:10 (more preferably from about 1:0.2 to about 1:7) orthogonal to the stretch direction is preferred.

Suitable multilayer devices may also be prepared using techniques such as spin coating, e.g., as described in Boese et al., J. Polym. Sci.: Part B, 30:1321 (1992) for birefringent polyimides, and vacuum deposition, e.g., as described by Zang et. al., Appl. Phys. Letters, 59:823 (1991) for crystalline organic compounds; the latter technique is particularly useful for certain combinations of crystalline organic compounds and inorganic materials.

Orientation of the extruded film was done by stretching individual sheets of the material in heated air. For economical production, stretching may be accomplished on a continuous basis in a standard length orienter, tenter oven, or both. Economies of scale and line speeds of standard polymer film production may be achieved thereby achieving manufacturing costs that are substantially lower than costs associated with commercially available absorptive polarizers.

Lamination of two or more sheets together is advantageous, to improve reflectivity or to broaden the bandwidth, or to form a mirror from two polarizers. Amorphous copolyesters are useful as laminating materials, with VITEL Brand 3000 and 3300 from the Goodyear Tire and Rubber Co. of Akron, Ohio, noted as materials that have been tried. The choice of laminating material is broad, with adhesion to the sheets 10, optical clarity and exclusion of air being the primary guiding principles.

It may be desirable to add to one or more of the layers, one or more inorganic or organic adjuvants such as an antioxidant, extrusion aid, heat stabilizer, ultraviolet ray absorber, nucleator, surface projection forming agent, and the like in normal quantities so long as the addition does not substantially interfere with the performance of the present invention.

Optical Behavior and Design Considerations of Multilayer Stacks

The optical behavior of a multilayer stack 10 such as that shown above in FIGS. 1a and 1b will now be described in more general terms.

The optical properties and design considerations of multilayer stacks described below allow the construction of multilayer stacks for which the Brewster angle (the angle at which reflectance goes to zero) is very large or is nonexistent. This allows for the construction of multilayer mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

The average transmission at normal incidence for a multilayer stack, (for light polarized in the plane of the extinction axis in the case of polarizers, or for both polarizations in the case of mirrors), is desirably less than 50% (reflectivity of 0.5) over the intended bandwidth. (It shall be understood that for the purposes of the present application, all transmission or reflection values given include front and back surface reflections). Other multilayer stacks exhibit lower average transmission and/or a larger intended bandwidth, and/or over a larger range of angles from the normal. If the intended bandwidth is to be centered around one color only, such as red, green or blue, each of which has an effective bandwidth of about 100 nm each, a multilayer stack with an average transmission of less than 50% is desirable. A multilayer stack having an average transmission of less than 10% over a bandwidth of 100 nm is also preferred. Other exemplary preferred multilayer stacks have an average transmission of less than 30% over a bandwidth of 200 nm. Yet another preferred multilayer stack exhibits an average transmission of less than 10% over the bandwidth of the visible spectrum (400–700 nm). Most preferred is a multilayer stack that exhibits an average transmission of less than 10% over a bandwidth of 380 to 740 nm. The extended bandwidth is useful even in visible light applications in order to accommodate spectral shifts with angle, and variations in the multilayer stack and overall film caliper.

The multilayer stack 10 can include tens, hundreds or thousands of layers, and each layer can be made from any of a number of different materials. The characteristics which determine the choice of materials for a particular stack depend upon the desired optical performance of the stack.

The stack can contain as many materials as there are layers in the stack. For ease of manufacture, preferred optical thin film stacks contain only a few different materials. For purposes of illustration, the present discussion will describe multilayer stacks including two materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

Several parameters may affect the maximum reflectivity achievable in any multilayer stack. These include basic stack design, optical absorption, layer thickness control and the relationship between indices of refraction of the layers in the stack. For high reflectivity and/or sharp bandedges, the basic stack design should incorporate optical interference effects using standard thin film optics design. This typically involves using optically thin layers, meaning layers having an optical thickness in the range of 0.1 to 1.0 times the wavelength of interest. The basic building blocks for high reflectivity multilayer films are low/high index pairs of film layers, wherein each low/high index pair of layers has a combined optical thickness of ½ the center wavelength of the band it is designed to reflect. Stacks of such films are commonly referred to as quarterwave stacks.

To minimize optical absorption, the preferred multilayer stack ensures that wavelengths that would be most strongly absorbed by the stack are the first wavelengths reflected by the stack. For most clear optical materials, including most polymers, absorption increases toward the blue end of the visible spectrum. Thus, it is preferred to tune the multilayer stack such that the "blue" layers are on the incident side of the multilayer stack.

A multilayer construction of alternative low and high index thick films, often referred to as a "pile of plates", has no tuned wavelengths nor bandwidth constraints, and no wavelength is selectively reflected at any particular layer in the stack. With such a construction, the blue reflectivity suffers due to higher penetration into the stack, resulting in higher absorption than for the preferred quarterwave stack design. Arbitrarily increasing the number of layers in a "pile of plates" will not always give high reflectivity, even with zero absorption. Also, arbitrarily increasing the number of layers in any stack may not give the desired reflectivity, due to the increased absorption which would occur.

The relationships between the indices of refraction in each film layer to each other and to those of the other layers in the film stack determine the reflectance behavior of the multilayer stack at any angle of incidence, from any azimuthal direction. Assuming that all layers of the same material have the same indices, then a single interface of a two component quarterwave stack can be analyzed to understand the behavior of the entire stack as a function of angle.

For simplicity of discussion, therefore, the optical behavior of a single interface will be described. It shall be understood, however, that an actual multilayer stack according to the principles described herein could be made of tens, hundreds or thousands of layers. To describe the optical behavior of a single interface, such as the one shown in FIG.

2, the reflectivity as a function of angle of incidence for s and p polarized light for a plane of incidence including the z-axis and one in-plane optic axis will be plotted.

FIG. 2 shows two material film layers forming a single interface, with both immersed in an isotropic medium of index no. For simplicity of illustration, the present discussion will be directed toward an orthogonal multilayer birefringent system with the optical axes of the two materials aligned, and with one optic axis (z) perpendicular to the film plane, and the other optic axes along the x and y axis. It shall be understood, however, that the optic axes need not be orthogonal, and that nonorthogonal systems are well within the spirit and scope of the present invention. It shall be further understood that the optic axes also need not be aligned with the film axes to fall within the intended scope of the present invention.

The reflectivity of a dielectric interface varies as a function of angle of incidence, and for isotropic materials, is different for p and s polarized light. The reflectivity minimum for p polarized light is due to the so called Brewster effect, and the angle at which the reflectance goes to zero is referred to as Brewster's angle.

The reflectance behavior of any filing stack, at any angle of incidence, is determined by the dielectric tensors of all films involved. A general theoretical treatment of this topic is given in the text by R. M. A. Azzam and N. M. Bashara, "Ellipsometry and Polarized Light", published by North-Holland, 1987.

The reflectivity for a single interface of a system is calculated by squaring the absolute value of the reflection coefficients for p and s polarized light, given by equations 1 and 2, respectively. Equations 1 and 2 are valid for uniaxial orthogonal systems, with the axes of the two components aligned.

$$r_{pp} = \frac{n2z * n2o\sqrt{(n1z2 - no\sin2\theta)} - n1z * n1o\sqrt{(n2z2 - no\sin2\theta)}}{n2z * n2o\sqrt{(n1z2 - no\sin2\theta)} + n1z * n1o\sqrt{(n2z2 - no\sin2\theta)}} \quad 1)$$

$$r_{ss} = \frac{\sqrt{(n1o2 - no\sin2\theta)} - \sqrt{(n2o2 - no\sin2\theta)}}{\sqrt{(n1o2 - no\sin2\theta)} + \sqrt{(n2o2 - no\sin2\theta)}} \quad 2)$$

where θ is measured in the isotropic medium.

In a uniaxial birefringent system, n1x=n1y=n1o, and n2n=n2y=n2o.

For a biaxial birefringent system, equations 1 and 2 are valid only for light with its plane of polarization parallel to the x-z or y-z planes, as defined in FIG. 2. So, for a biaxial system, for light incident in the x-z plane, n1o =n1x and n2o =n2x in equation 1 (for p-polarized light), and n1o =n1y and n2o =n2y in equation 2 (for s-polarized light). For light incident in the y-z plane, n1o=n1y and n2o =n2y in equation 1 (for p-polarized light), and n1o=n1x and n2o=n2x in equation 2 (for s-polarized light).

Equations 1 and 2 show that reflectivity depends upon the indices of refraction in the x, y (in-plane) and z directions of each material in the stack. In an isotropic material, all three indices are equal, thus nx=ny=nz. The relationship between nx, ny and nz determine the optical characteristics of the material. Different relationships between the three indices lead to three general categories of materials: isotropic, uniaxially birefringent, and biaxially birefringent. Equations 1 and 2 describe biaxially birefringent cases only along the x or y axis, and then only if considered separately for the x and y directions.

A uniaxially birefringent material is defined as one in which the index of refraction in one direction is different from the indices in the other two directions. For purposes of the present discussion, the convention for describing uniaxially birefringent systems is for the condition nx=ny nz. The x and y axes are defined as the in-plane axes and the respective indices, nx and ny, will be referred to as the in-plane indices.

One method of creating a uniaxial birefringent system is to biaxially stretch (e.g., stretch along two dimensions) a multilayer stack in which at least one of the materials in the stack has its index of refraction affected by the stretching process (e.g., the index either increases or decreases). Biaxial stretching of the multilayer stack may result in differences between refractive indices of adjoining layers for planes parallel to both axes thus resulting in reflection of light in both planes of polarization.

A uniaxial birefringent material can have either positive or negative uniaxial birefringence. Positive uniaxial birefringence occurs when the z-index is greater than the in-plane indices (nz>nx and ny). Negative uniaxial birefringence occurs when the z-index is less than the in-plane indices (nz<nx and ny).

A biaxial birefringent material is defined as one in which the indices of refraction in all three axes are different, e.g., nx ny nz. Again, the nx and ny indices will be referred to as the in-plane indices. A biaxial birefringent system can be made by stretching the multilayer stack in one direction. In other words the stack is uniaxially stretched. For purposes of the present discussion, the x direction will be referred to as the stretch direction for biaxial birefringent stacks.

Mirror

To make a mirror, two uniaxially stretched polarizing sheets 10 are positioned with their respective orientation axes rotated 90°, or the sheet 10 is biaxially stretched. In the latter case, both PEN refractive indices in the plane of the sheet increase and the selected polymer should be chosen with as low of a refractive index as possible to reflect light of both planes of polarization. Biaxially stretching the multilayered sheet will result in differences between refractive indices of adjoining layers for planes parallel to both axes thereby resulting in reflection of light in both planes of polarization directions. Biaxially stretching PEN will increase the refractive indices associated with those axes of elongation from 1.64 to only 1.75, compared to the uniaxial value of 1.9. Therefore to create a dielectric mirror with 99 percent reflectivity (and thus with no noticeable iridescence) a low refractive index coPET is preferred as the selected polymer. Optical modeling indicates this is possible with an index of about 1.55. A 300-layer film with a 5 percent standard deviation in layer thickness, designed to cover half of the visible spectrum with six overlapping quarterwave stacks, has the predicted performance shown in FIG. 18. A greater degree of symmetry of stretching yields an article that exhibits relatively more symmetric reflective properties and relatively less polarizing properties.

If desired, two or more sheets of the invention may be used in a composite to increase reflectivity, optical band width, or both. If the optical thicknesses of pairs of layers within the sheets are substantially equal, the composite will reflect, at somewhat greater efficiency, substantially the same band width and spectral range of reflectivity (i.e., "band") as the individual sheets. If the optical thicknesses of pairs of layers within the sheets are not substantially equal, the composite will reflect across a broader band width than the individual sheets. A composite combining mirror sheets with polarizer sheets is useful for increasing total reflectance while still polarizing transmitted light. Alternatively, a single sheet may be asymmetrically biaxially stretched to produce a film having selective reflective and polarizing properties.

The preferred selected polymer for use in a biaxially stretched mirror application is based on terephthalic, isophthalic, sebacic, azelaic or cyclohexanedicarboxylic acid to attain the lowest possible refractive index while still maintaining adhesion to the PEN layers. Naphthalene dicarboxylic acid may still be employed in minor amounts to improve the adhesion to PEN. The diol component may be taken from any that have been previously mentioned. Preferably the selected polymer has an index of refraction of less than 1.65 and more preferably an index of refraction of less than 1.55.

It is not required that the selected polymer be a copolyester or copolycarbonate. Vinyl polymers and copolymers inade from monomers such as vinyl naphthalenes, styrenes, ethylene, maleic anhydride, acrylates, methacrylates, might be employed. Condensation polymers other than polyesters and polycarbonates might also be useful, examples include: polysulfones, polyamides, polyurethanes, polyamic acids, polyimides. Naphthalene groups and halogens such as chlorine, bromine and iodine are useful in increasing the refractive index of the selected polymer to the desired level (1.59 to 1.69) to substantially match the refractive index of PEN associated with the transverse direction for a polarizer. Acrylate groups and fluorine are particularly useful in decreasing refractive index for use in a mirror.

The optical properties and design considerations of uniaxial birefringent systems will now be discussed. As discussed above, the general conditions for a uniaxial birefringent material are nx=ny nz. Thus if each layer 102 and 104 in FIG. 2 is uniaxially birefringent, n1x=n1y and n2x=n2y. For purposes of the present discussion, assume that layer 102 has larger in-plane indices than layer 104, and that thus n1>n2 in both the x and y directions. The optical behavior of a uniaxial birefringent multilayer system can be adjusted by varying the values of n1z and n2z to introduce different levels of positive or negative birefringence. The relationship between the various indices of refraction can be measured directly, or, the general relationship may be indirectly observed by analysis of the spectra of the resulting film as described herein.

In the case of mirrors, the desired average transmission for light of each polarization and plane of incidence generally depends upon the intended use of the mirror. The average transmission along each stretch direction at normal incidence for a narrow bandwidth mirror across a 100 nm bandwidth within the visible spectrum is desirably less than 30%, preferably less than 20% and more preferably less than 10%. A desirable average transmission along each stretch direction at normal incidence for a partial mirror ranges anywhere from, for example, 10% to 50%, and can cover a bandwidth of anywhere between, for example, 100 nm and 450 nm, depending upon the particular application. For a high efficiency mirror, average transmission along each stretch direction at normal incidence over the visible spectrum (400–700nm) is desirably less than 10%, preferably less than 5%, more preferably less than 2%, and even more preferably less than 1%. In addition, asymmetric mirrors may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Equation 1 described above can be used to determine the reflectivity of a single interface in a uniaxial birefringent system composed of two layers such as that shown in FIG. 2. Equation 2, for s polarized light, is identical to that of the case of isotropic films (nx=ny=nz), so only equation 1 need be examined. For purposes of illustration, some specific, although generic, values for the film indices will be assigned. Let n1x=n1y=1.75, n1z=variable, n2x=n2y=1.50, and n2z=variable. In order to illustrate various possible Brewster angles in this system, no=1.60 for the surrounding isotropic media.

Figure 23:
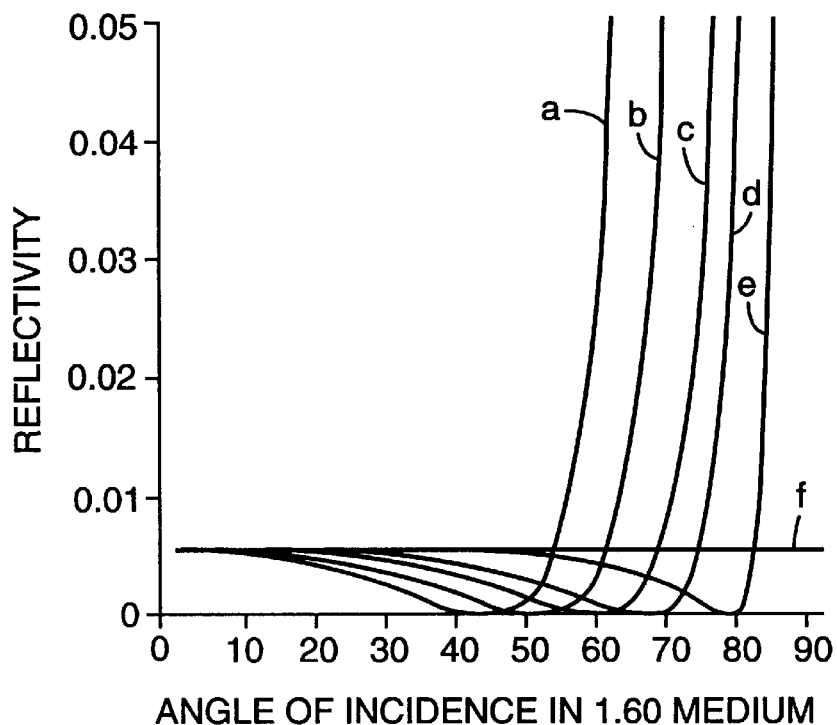
FIGS. 23 and 24 show reflectivity versus angle curves for a uniaxial birefringent system in a medium of index 1.60.

FIG. 23 shows reflectivity versus angle curves for p-polarized light: incident from the isotropic medium to the birefringent layers, for cases where n1z is numerically greater than or equal to n2z (n1z>n2z). The curves shown in FIG. 23 are for the following z-index values: a) n1z=1.75, n2z=1.50; b) n1z=1.75, n2z=1.57; c) n1z=1.70, n2z=1.60; d) n1z=1.65, n2z=1.60; e) n1z=1.61, n2z=1.60; and f) n1z =1.60=n2z. As n1z approaches n2z, the Brewster angle, the angle at which reflectivity goes to zero, increases. Curves a–e are strongly angular dependent. However, when n1z= n2z (curve f), there is no angular dependence to reflectivity. In other words, the reflectivity for curve f is constant for all angles of incidence. At that point, equation 1 reduces to the angular independent form: (n2o−n1o)/(n2o+n1o). When n1z=n2z, there is no Brewster effect and there is constant reflectivity for all angles of incidence.

Figure 24:
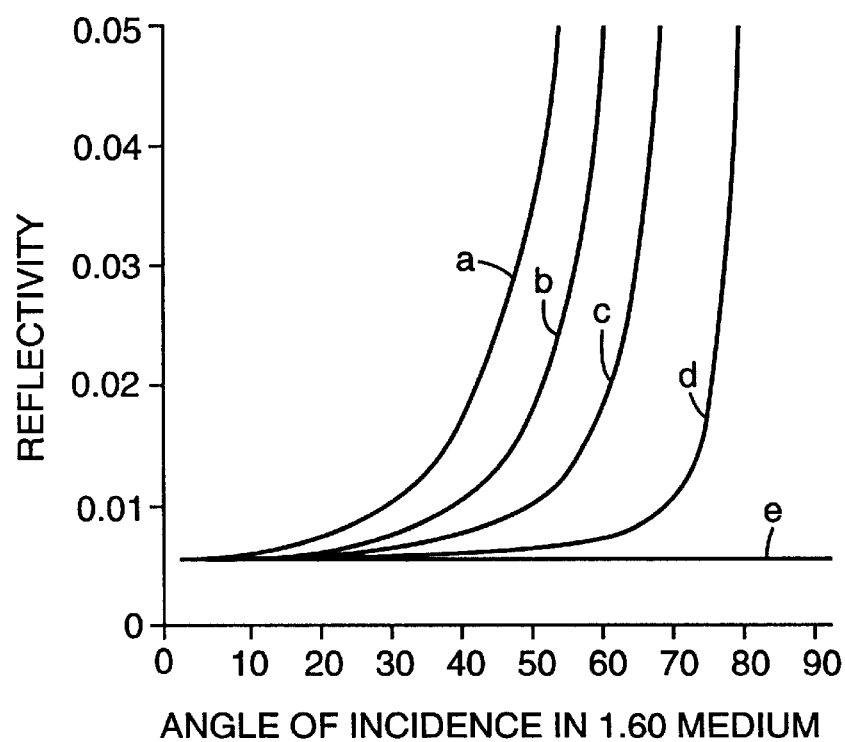

FIG. 24 shows reflectivity versus angle of incidence curves for cases where n1z is numerically less than or equal to n2z. Light is incident from isotropic medium to the birefringent layers. For these cases, the reflectivity monotonically increases with angle of incidence. This is the behavior that would be observed for s-polarized light. Curve a in FIG. 24 shows the single case for s polarized light. Curves b–e show cases for p polarized light for various values of nz, in the following order: b) n1z=1.50, n2z=1.60; c) n1z=1.55, n2z=1.60; d) n1z=1.59, n2z=1.60; and e) n1z=1.60=n2z. Again, when n1z=n2z (curve e), there is no Brewster effect, and there is constant reflectivity for all angles of incidence.

Figure 25:
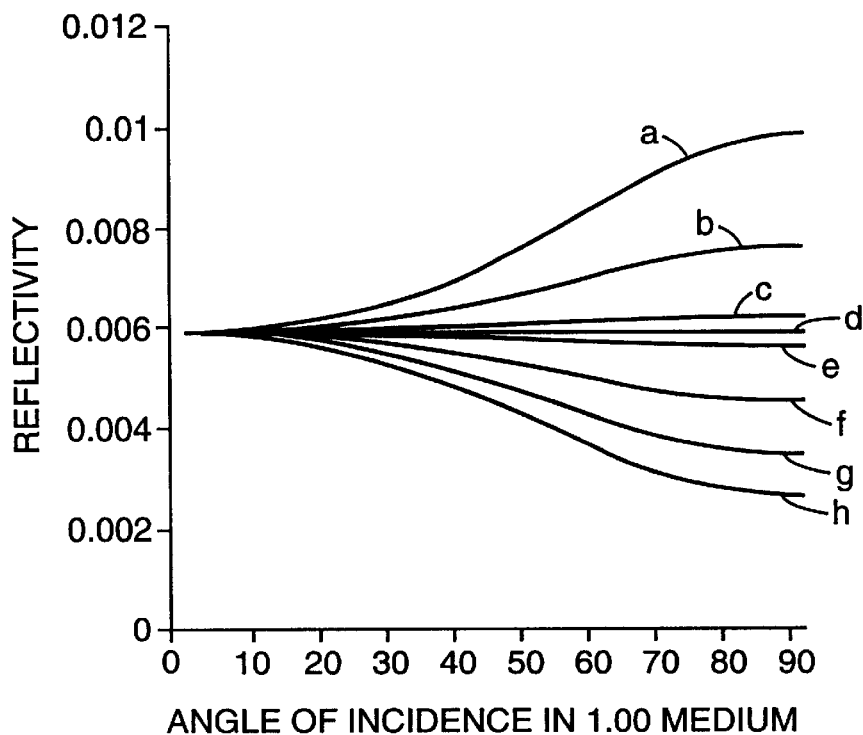
FIG. 25 shows reflectivity versus angle curves for a uniaxial birefringent system in a medium of index 1.0.

FIG. 25 shows the same cases as FIG. 23 and 24 but for an incident medium of index no=1.0 (air). The curves in FIG. 25 are plotted for p polarized light at a single interface of a positive uniaxial material of indices n2x=n2y=1.50, n2z=1.60, and a negative uniaxially birefringent material with nix=n1y=1.75, and values of n1z, in the following order, from top to bottom, of a) 1.50; b) 1.55; c) 1.59; d) 1.60; f) 1.61; g) 1.65; h) 1.70; and i) 1.75. Again, as was shown in FIGS. 23 and 24, when the values of n1z and n2z match (curve d), there is no angular dependence to reflectivity.

FIGS. 23, 24 and 25 show that the cross-over from one type of behavior to another occurs when the z-axis index of one film equals the z-axis index of the other film. This is true for several combinations of negative and positive uniaxially birefringent, and isotropic materials. Other situations occur in which the Brewster angle is shifted to larger or smaller angles.

Figure 26:
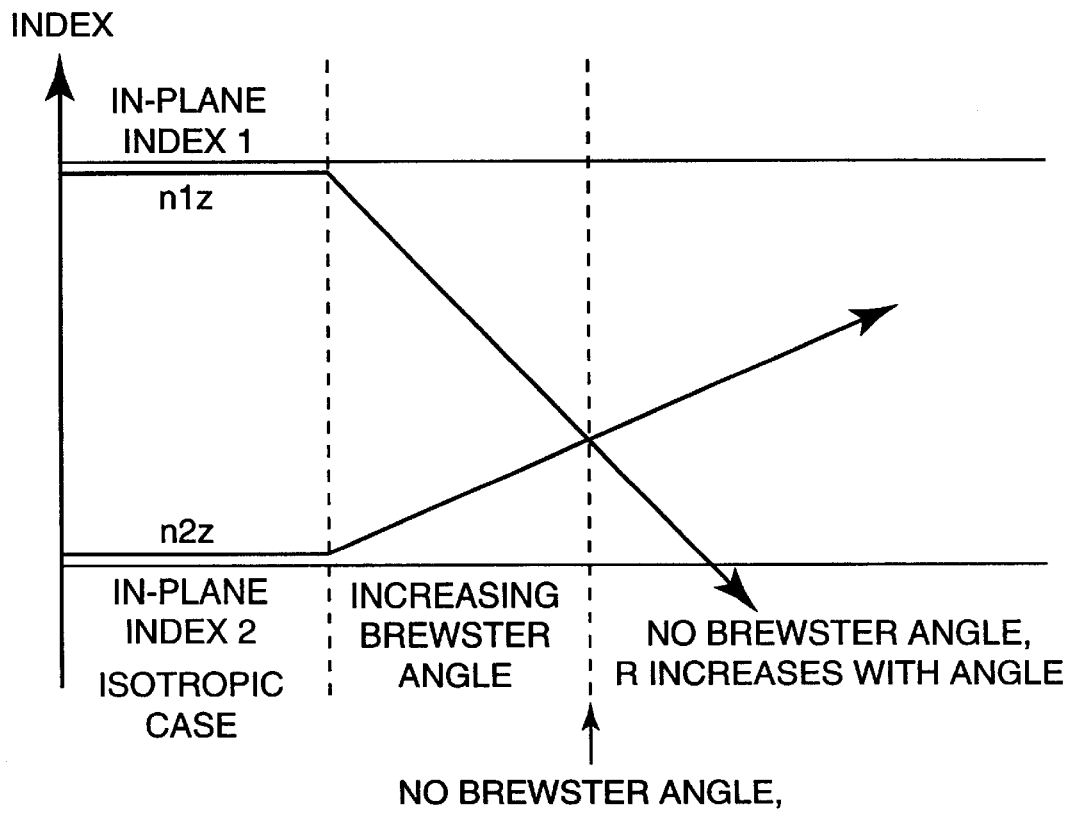
FIGS. 26, 27 and 28 show various relationships between in plane indices and z-index for a uniaxial birefringent system.
Figure 27:
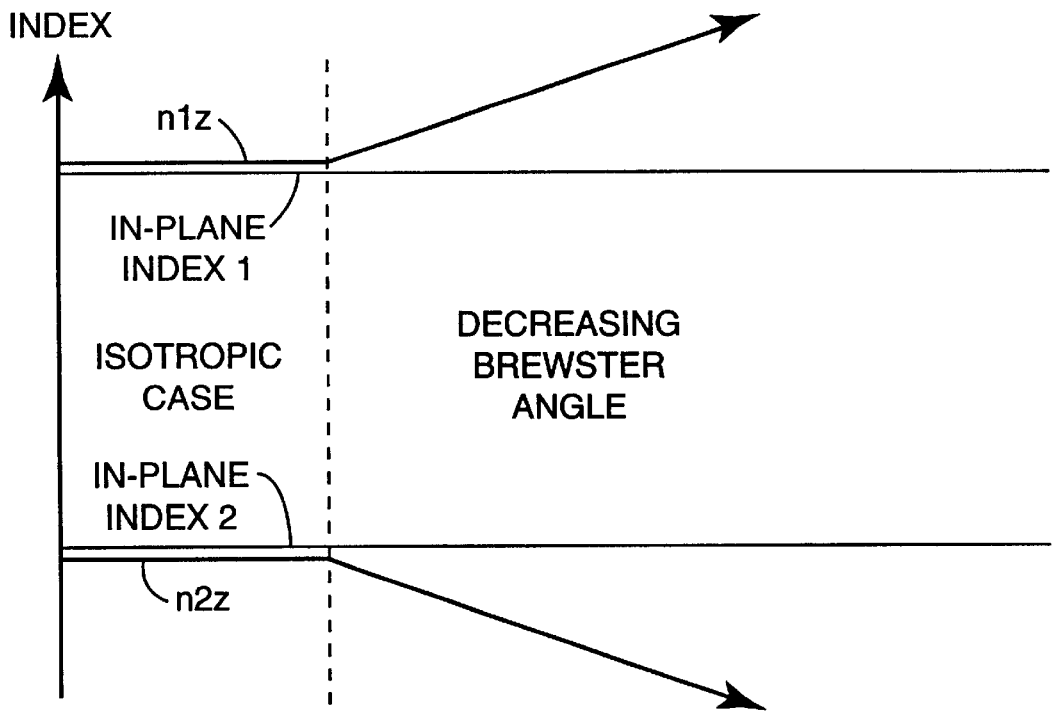
Figure 28:
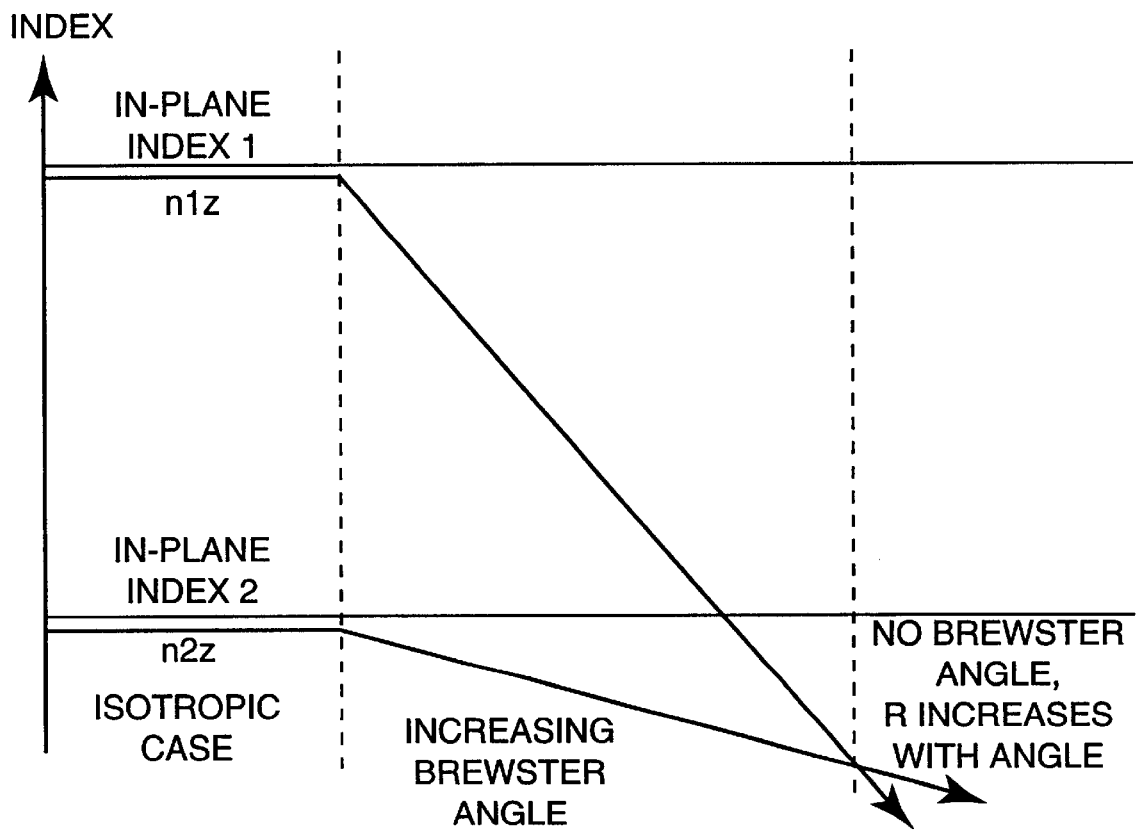

Various possible relationships between in-plane indices and z-axis indices are illustrated in FIGS. 26, 27 and 28. The vertical axes indicate relative values of indices and the horizontal axes are used to separate the various conditions. Each Figure begins at the left with two isotropic films, where the z-index equals the in-plane indices. As one proceeds to the right, the in-plane indices are held constant and the various z-axis indices increase or decrease, indicating the relative amount of positive or negative birefringence.

The case described above with respect to FIGS. 23, 24, and 25 is illustrated in FIG. 26. The in-plane indices of material one are greater than the in-plane indices of material two, material 1 has negative birefringence (n1z less than in-plane indices), and material two has positive birefringence (n2z greater than in-plane indices). The point at which the Brewster angle disappears and reflectivity is constant for all angles of incidence is where the two z-axis indices are equal. This point corresponds to curve f in FIG. 23, curve e in FIG. 24 or curve d in FIG. 25.

In FIG. 27, material one has higher in-plane indices than material two, but material one has positive birefringence and material two has negative birefringence. In this case, the Brewster minimum can only shift to lower values of angle.

Both FIGS. 26 and 27 are valid for the limiting cases where one of the two films is isotropic. The two cases are where material one is isotropic and material two has positive birefringence, or material two is isotropic and material one has negative birefringence. The point at which there is no Brewster effect is where the z-axis index of the birefringent material equals the index of the isotropic film.

Another case is where both films are of the same type, i.e., both negative or both positive birefringent. FIG. 28 shows the case where both films have negative birefringence. However, it shall be understood that the case of two positive birefringent layers is analogous to the case of two negative birefringent layers shown in FIG. 28. As before, the Brewster minimum is eliminated only if one z-axis index equals or crosses that of the other film.

Yet another case occurs where the in-plane indices of the two materials are equal, but the z-axis indices differ. In this case, which is a subset of all three cases shown in FIGS. 26–28, no reflection occurs for s polarized light at any angle, and the reflectivity for p polarized light increases monotonically with increasing angle of incidence. This type of article has increasing reflectivity for p-polarized light as angle of incidence increases, and is transparent to s-polarized light. This article can be referred to as a "p-polarizer".

The above described principles and design considerations describing the behavior of uniaxially birefringent systems can be applied to create multilayer stacks having the desired optical effects for a wide variety of circumstances and applications. The indices of refraction of the layers in the multilayer stack can be manipulated and tailored to produce devices having the desired optical properties. Many negative and positive uniaxial birefringent systems can be created with a variety of in-plane and z-axis indices, and many useful devices can be designed and fabricated using the principles described here.

Polarizer

The reflective polarizer of the present invention is useful in optical elements such as ophthalmic lenses, mirrors and windows. The polarizer is characterized by a mirror-like look which is considered stylish in sunglasses. In addition, PEN is a very good ultraviolet filter, absorbing ultraviolet efficiently up to the edge of the visible spectrum. The reflective polarizer of the present invention would also be useful as a thin infrared sheet polarizer.

For the polarizer, the sheet is preferably oriented by stretching in a single direction and the index of refraction of the PEN layer exhibits a large difference between incident light rays with the plane of polarization parallel to the oriented and transverse directions. The index of refraction associated with an in-plane axis (an axis parallel to the surface of the film) is the effective index of refraction for plane-polarized incident light whose plane of polarization is parallel to that axis. By oriented direction is meant the direction in which the film is stretched. By transverse direction is meant that direction orthogonal in the plane of the film to the direction in which the film is oriented.

For the polarizer, the PEN/selected polymer layers have at least one axis for which the associated indices of refraction are preferably substantially equal. The match of refractive indices associated with that axis, which typically is the transverse axis, results in substantially no reflection of light in that plane of polarization. The selected polymer layer may also exhibit a decrease in the refractive index associated with the stretch direction. A negative birefringence of the selected polymer has the advantage of increasing the difference between indices of refraction of adjoining layers associated with the orientation axis while the reflection of light with its plane of polarization parallel to the transverse direction is still negligible. Differences between the transverse axis associated indices of refraction of adjoining layers after stretching should be less than 0.05 and preferably less than 0.02. Another possibility is that the selected polymer exhibits some positive birefringence due to stretching, but this can be relaxed to match the refractive index of the transverse axis of the PEN layers in a heat treatment. The temperature of this heat treatment should not be so high as to relax the birefringence in the PEN layers.

The preferred selected polymer for the polarizer of the present invention is a copolyester of the reaction product of a naphthalene dicarboxylic acid or its ester such as dimethyl naphthalate ranging from 20 mole percent to 80 mole percent and isophthalic or terephthalic acid or their esters such as dimethyl terephthalate ranging from 20 mole percent to 80 mole percent reacted with ethylene glycol. Other copolyesters within the scope of the present invention have the properties discussed above and have a refractive index associated with the transverse axis of approximately 1.59 to 1.69. Of course, the copolyester must be coextrudable with PEN. Other suitable copolyesters are based on isophthalic, azelaic, adipic, sebacic, dibenzoic, terephthalic, 2,7-naphthalene dicarboxylic, 2,6-naphthalene dicarboxylic or cyclohexanedicarboxylic acids. Other suitable variations in the copolyester include the use of ethylene glycol, propane diol, butane diol, neopentyl glycol, polyethylene glycol, tetramethylene glycol, diethylene glycol, cyclohexanedimethanol, 4-hydroxy diphenol, propane diol, bisphenol A, and 1,8-dihydroxy biphenyl, or 1,3-bis(2-hydroxyethoxy)benzene as the diol reactant. A volume average of the refractive indices of the monomers would be a good guide in preparing useful copolyesters. In addition, copolycarbonates having a glass transition temperature compatible with the glass transition temperature of PEN and with a refractive index associated with the transverse axis of approximately 1.59 to 1.69 are also useful as a selected polymer in the present invention. Formation of the copolyester or copolycarbonate by transesterification of two or more polymers in the extrusion system is another possible route to a viable selected polymer.

Referring to FIG. 2, two component orthogonal biaxial birefringent systems and the design considerations affecting the resultant optical properties will now be described. Again, the system can have many layers, but an understanding of the optical behavior of the stack is achieved by examining the optical behavior at one interface.

A biaxial birefringent system can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. As a result, the biaxial birefringent system acts as a polarizer, transmitting light of one polarization and reflecting light of the other polarization. By controlling the three indices of refraction of each film, nx, ny and nz, the desired polarizer behavior can be obtained. Again, the indices of refraction can be measured directly or can be indirectly observed by analysis of the spectra of the resulting film, as described herein.

Referring again to FIG. 2, the following values to the film indices are assigned for purposes of illustration: n1x=1.88, n1y=1.64, n1z=variable, n2x=1.65, n2y=variable, and n2z=variable. The x direction is referred to as the extinction direction and the y direction as the transmission direction.

Equation 1 can be used to predict the angular behavior of the biaxial birefringent system for two important cases of light with a plane of incidence in either the stretch (xz plane) or the non-stretch (yz plane) directions. The polarizer is a mirror in one polarization direction and a window in the other direction. In the stretch direction, the large index differential of 1.88–1.65=0.23 in a multilayer stack with hundreds of layers will yield very high reflectivities for s-polarized light. For p-polarized light the reflectance at various angles depends on the n1z/n2z index differential.

In many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest. Average transmission at normal incidence for a narrow bandpolarizer across a 100 nm bandwidth is desirably at least 50%, preferably at least 70% and more preferably at least 90%. The average transmission at 60 degrees from the normal for p-polarized light (measured along the transmission axis) for a narrow band polarizer across a 100 nm bandwidth is desirably at least 50%, preferably at least 70% and more preferably at least 80%.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis) for a polarizer from 400–700 nm is desirably at least 50%, preferably at least 70%, more preferably at least 80%, and even more preferably at least 90%.

For certain applications, high reflectivity in the transmission axis at off-normal angles are preferred. The average reflectivity for light polarized along the transmission axis should be more than 20% at an angle of at least 20 degrees from the normal.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, $C_{RMS}$, can be determined according to the equation:

$$C_{RMS} = \frac{\int_{\lambda 1}^{\lambda 2} ((T - \bar{T})^2)^{1/2} d\lambda}{\bar{T}}$$

where the range $\lambda 1$ to $\lambda 2$ is the wavelength range, or bandwidth, of interest, T is the transmissivity along the transmission axis, and $\bar{T}$ is the average transmissivity along the transmission axis in the wavelength range of interest.

For applications where a low color polarizer is desirable, the % RMS color should be less than 10%, preferably less than 8%, more preferably less than 3.5%, and even more preferably less than 2.1% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For example, for narrow band polarizers having a bandwidth of approximately 100 nm, average transmission along the extinction axis at normal incidence is desirably less than 50%, preferably less than 30%, more preferably less than 10%, and even more preferably less than 3%. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than3%.

Reflectivity at off-normal angles, for light with its plane of polarization parallel to the transmission axis may be caused by a large z-index mismatch, even if the in-plane y indices are matched. The resulting system thus has large reflectivity for p, and is highly transparent to s polarized light. This case was referred to above in the analysis of the mirror cases as a "p polarizer".

For uniaxially stretched polarizers, performance depends upon the relationships between the alternating layer indices for all three (x, y, and z) directions. As described herein, it is desirable to minimize the y and z index differentials for a high efficiency polarizer. Introduction of a y-index mismatch is described to compensate for a z-index mismatch. Whether intentionally added or naturally occurring, any index mismatch will introduce some reflectivity. An important factor thus is making the x-index differential larger than the y- and z-index differentials. Since reflectivity increases rapidly as a function of index differential in both the stretch and non-stretch directions, the ratios $\Delta ny/\Delta nx$ and $\Delta nz/\Delta nx$ should be minimized to obtain a polarizer having high extinction along one axis across the bandwidth of interest and also over a broad range of angles, while preserving high transmission along the orthogonal axis. Ratios of less than 0.05, 0.1 or 0.25 are acceptable. Ideally, the ratio $\Delta nz/\Delta nx$ is 0, but ratios of less than 0.25 or 0.5 also produce a useable polarizer.

Figure 29:
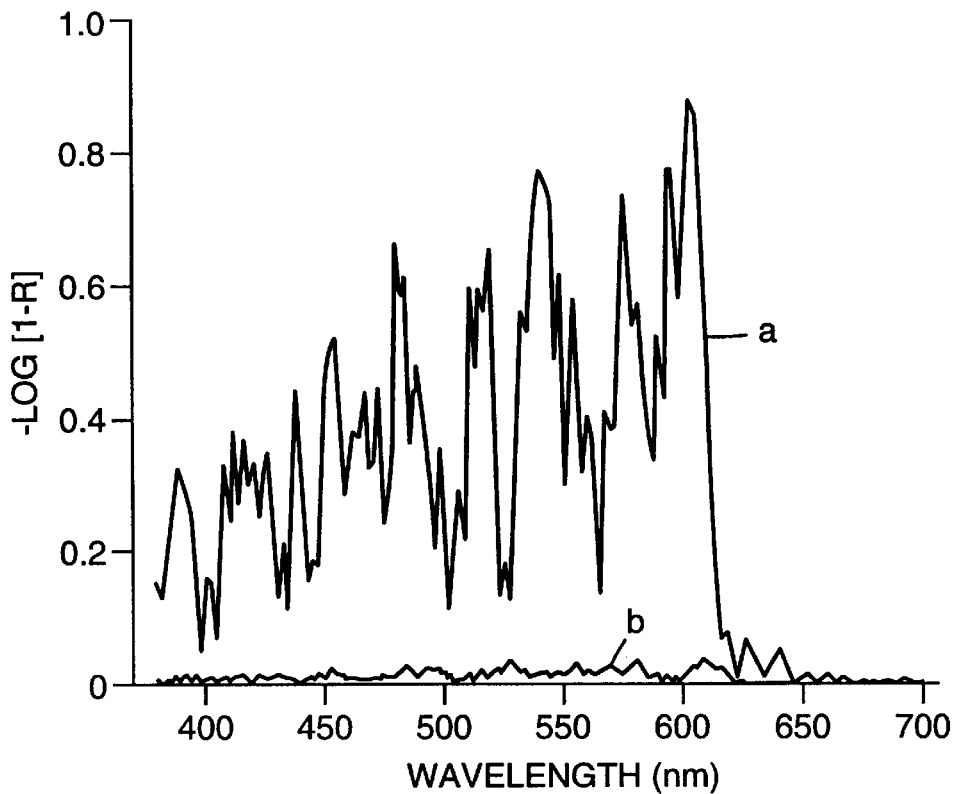
FIG. 29 shows off axis reflectivity versus wavelength for two different biaxial birefringent systems.

FIG. 29 shows the reflectivity (plotted as -Log[1-R]) at 75° for p polarized light with its plane of incidence in the non-stretch direction, for an 800 layer stack of PEN/coPEN. The reflectivity is plotted as function of wavelength across the visible spectrum (400–700 nm). The relevant indices for curve a at 550 nm are n1y=1.64, n1z=1.52, n2y=1.64 and n2z=1.63. The model stack design is a linear thickness grade for quarterwave pairs, where each pair thickness is given by dn=do+do(0.003)n. All layers were assigned a random thickness error with a gaussian distribution and a 5% standard deviation.

Curve a shows high off-axis reflectivity across the visible spectrum along the transmission axis (the y-axis) and that different wavelengths experience different levels of reflectivity. This is due to the large z-index mismatch ($\Delta nz=0.11$). Since the spectrum is sensitive to layer thickness errors and spatial nonuniformities, such as film caliper, this gives a biaxial birefringent system with a very nonuniform and "colorful" appearance. Although a high degree of color may be desirable for certain applications, it is desirable to control the degree of off-axis color, and minimize it for those applications requiring a uniform, low color appearance, such as liquid crystal displays or other types of displays.

Off-axis reflectivity, and off-axis color can be minimized by introducing an index mismatch to the non-stretch in-plane indices (n1y and n2y) that create a Brewster condition off axis, while keeping the s-polarization reflectivity to a minimum.

Figure 30:
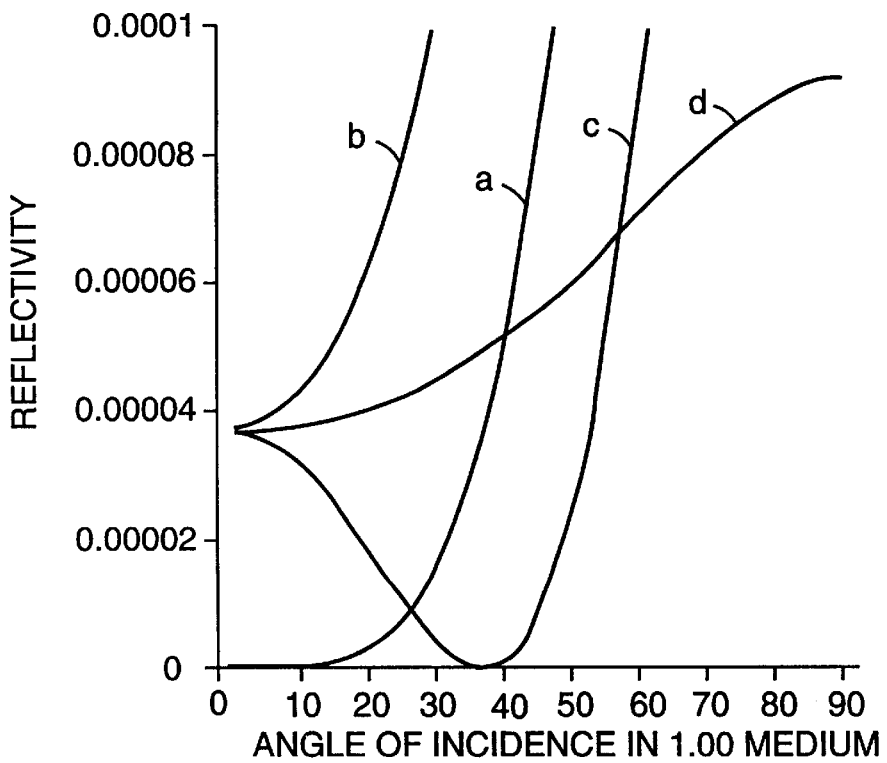
FIG. 30 shows the effect of introducing a y-index difference in a biaxial birefringent film with a large z-index difference.

FIG. 30 explores the effect of introducing a y-index mismatch in reducing off-axis reflectivity along the transmission axis of a biaxial birefringent system. With n1z=1.52 and n2z=1.63 ($\Delta$nz=0.11), the following conditions are plotted for p polarized light: a) n1y=n2y=1.64; b) n1y=1.64, n2y=1.62; c) n1y=1.64, n2y=1.66. Curve a shows the reflectivity where the in-plane indices n1y and n2y are equal. Curve a has a reflectance minimum at 0°, but rises steeply after 20°. For curve. b, n1y >n2y, and reflectivity increases rapidly. Curve c, where n1y<n2y, has a reflectance minimum at 38°, but rises steeply thereafter. Considerable reflection occurs as well for s polarized light for n1y≠n2y, as shown by curve d. Curves a–d of FIG. 30 indicate that the sign of the y-index mismatch (n1y–n2y) should be the same as the z-index mismatch (n1z–n2z) for a Brewster minimum to exist. For the case of n1y=n2y, reflectivity for s polarized light is zero at all angles.

By reducing the z-axis index difference between layers, the off axis reflectivity can be further reduced. If n1z is equal to n2z, FIG. 25 indicates that the extinction axis will still have a high reflectivity off-angle as it does at normal incidence, and no reflection would occur along the non-stretch axis at any angle because both indices are matched (e.g., n1y=n2y and n1z=n2z).

Exact matching of the two y indices and the two z indices may not be possible in some multilayer systems. If the z-axis indices are not matched in a polarizer construction, introduction of a slight mismatch may be desired for in-plane indices n1y and n2y. This can be done by blending additional components into one or both of the material layers in order to increase or decrease the respective y index. Blending a second resin into either the polymer that forms the highly birefringent layers or into the polymer that forms the selected polymer layers may be done to modify reflection for the transmission axis at normal and off-normal angles, or to modify the extinction of the polarizer for light polarized in the extinction axis. The second, blended resin may accomplish this by modifying the crystallinity and the index of refraction of the polymer layers after orientation.

Figure 31:
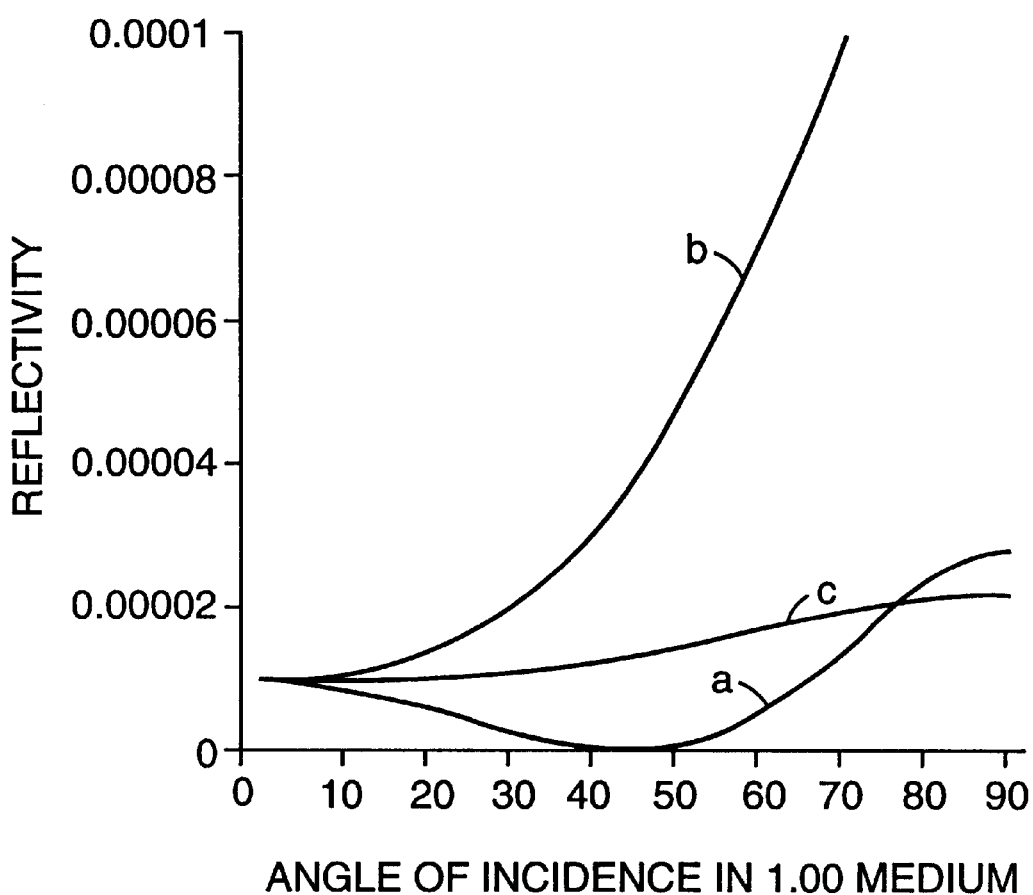
FIG. 31 shows the effect of introducing a y-index difference in a biaxial birefringent film with a smaller z-index difference.

Another example is plotted in FIG. 31, assuming n1z=1.56 and n2z=1.60 ($\Delta$nz=0.04), with the following y indices a) n1y=1.64, n2y=1.65; b) n1y=1.64, n2y=1.63. Curve c is for s-polarized light for either case. Curve a, where the sign of the y-index mismatch is the same as the z-index mismatch, results in the lowest off-angle reflectivity.

The computed off-axis reflectance of an 800 layer stack of films at 75° angle of incidence with the conditions of curve a in FIG. 31 is plotted as curve b in FIG. 29. Comparison of curve b with curve a in FIG. 29 shows that there is far less off-axis reflectivity, and therefore lower perceived color and better uniformity, for the conditions plotted in curve b. The relevant indices for curve b at 550nm are n1y=1.64, n1z=1.56, n2y=1.65 and n2z=1.60.

Figure 32:
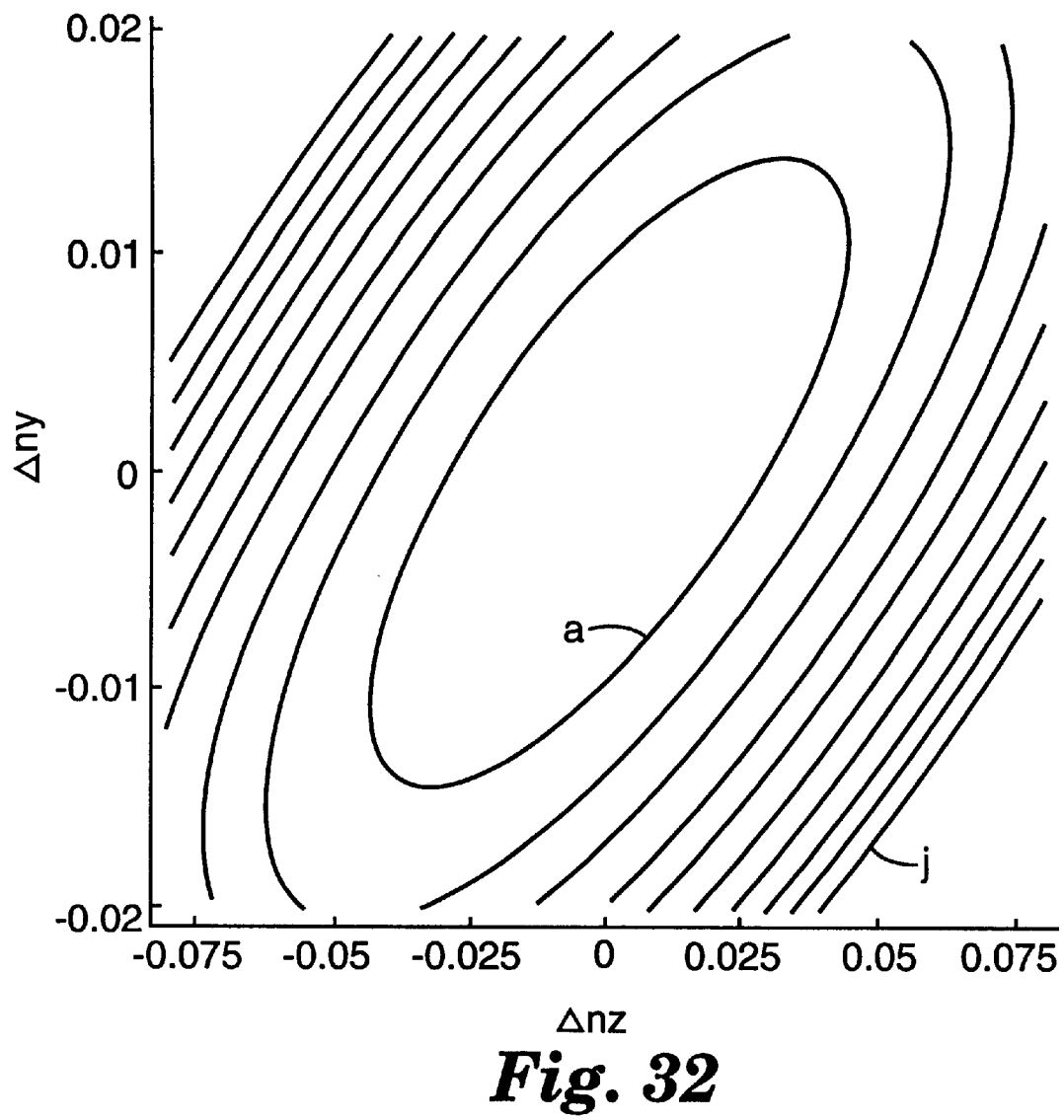
FIG. 32 shows a contour plot summarizing the information from FIGS. 30 and 31.

FIG. 32 shows a contour plot of equation 1 which summarizes the off axis reflectivity discussed in relation to FIG. 2 for p-polarized light. The four independent indices involved in the non-stretch direction have been reduced to two index mismatches, $\Delta$nz and $\Delta$ny. The plot is an average of 6 plots at various angles of incidence from 0° to 75° in 15 degree increments. The reflectivity ranges from 0.4×10$^{-4}$ for contour a, to 4.0×10$^{-4}$ for contour j, in constant increments of 0.4×10$^{-4}$. The plots indicate how high reflectivity caused by an index mismatch along one optic axis can be offset by a mismatch along the other axis.

Thus, by reducing the z-index mismatch between layers of a biaxial birefringent systems, and/or by introducing a y-index mismatch to produce a Brewster effect, off-axis reflectivity, and therefore off-axis color, are minimized along the transmission axis of a multilayer reflecting polarizer.

It should also be noted that narrow band polarizers operating over a narrow wavelength range can also be designed using the principles described herein. These can be made to produce polarizers in the red, green, blue, cyan, magenta, or yellow bands, for example.

An ideal reflecting polarizer should transmit all light of one polarization, and reflect all light of the other polarization. Unless laminated on both sides to glass or to another film with a clear optical adhesive, surface reflections at the air/reflecting polarizer interface will reduce the transmission of light of the desired polarization. Thus, it may in some cases be useful to add an antireflection (AR) coating to the reflecting polarizer. The AR coating is preferably designed to dereflect a film of index 1.64 for PEN based polarizers in air, because that is the index of all layers in the nonstretch (y) direction. The same coating will have essentially no effect on the stretch direction because the alternating index stack of the stretch direction has a very high reflection coefficient irrespective of the presence or absence of surface reflections. Any AR coating known in the art could be applied, provided that the coating does not overheat or damage the multilayer film being coated. An exemplary coating would be a quarterwave thick coating of low index material, ideally with index near the square root of 1.64 (for PEN based materials).

The Transparent Conductor

The multilayered polymer films described above are combined with a transparent conductor to provide a transparent multilayer device having broader reflectivity than either the multilayered polymer film or the transparent conductor alone. In particular, the multilayered polymer film provides good near infrared reflection (from about 750 nm up to about 2500 nm), but its reflectivity above about 2500 nm decreases considerably. On the other hand, the transparent conductor provides good far infrared reflection (above about 2500 nm) while its reflectivity in the near infrared region of the spectrum generally is not as good throughout this 750 nm to 2500 nm region as that of the multilayered polymer film. The transparent multilayered devices of the present invention can be designed or "tuned" to provide the desired infrared reflection while still transmitting sufficient light to be transparent.

The transparent conductors useful in the present invention are those that reflect light in the far infrared region of the spectrum, and more particularly include those effective in efficiently partitioning infrared light (above about 750 nm) from visible light (between about 380 nm and about 750 nm). In other words, the transparent conductor passes light in the wavelength region sensitive to the human eye while rejecting light in the infrared region. Because both high visible transmission and low near infrared transmission are desired, the reflective edge necessarily must be above about 750 nm, just out of the sensitivity of the human eye. Suitable transparent conductors are electrically conductive materials that reflect well in the far infrared spectrum and include metals, metal alloys, and semiconductive metal oxide materials. Preferred metals include silver, gold, copper, and aluminum. Other metals, such as nickel, sodium, chromium, tin, and titanium, may also be used, but they generally are not as effective in partitioning infrared light from visible light. Silver is particularly preferred since it can be applied in the form of a very thin film and optically has a relatively high transmittance over the entire visible light region while also possessing the ability to reflect light of longer wavelengths than visible light. Preferred semiconductive metal oxides include doped and undoped tin dioxide ($SnO_2$), zinc oxide (ZnO), and indium tin oxide (ITO) with the latter being particularly preferred. Preferred metal alloys include silver alloys, stainless steel, and inconel. Silver alloys, especially those containing at least 30 wt. % silver, are particularly preferred for the same reasons that silver is preferred, but have the added advantage of improved durability, such as a silver alloy containing, in addition to silver, less than 50 wt. % gold and/or less than 20 wt. % copper. The transparent conductor may comprise a single metal layer or a plurality of layers, each of which may contain one or more metals, metal alloys, and metal oxides.

The transparent conductor may be applied to the multilayered polymer films by conventional coating techniques well-known to those of ordinary skill in this art, with the understanding that the resulting multilayered device is transparent. Such known processes include pyrolysis, powder coating, vapor deposition, cathode sputtering, ion plating, and the like. Cathode sputtering and vapor deposition are often preferred in view of the uniformity of structure and thickness that can be obtained. Alternately, the transparent conductor may be a separate metalized polymer or glass sheet that is laminated to the multilayered polymer film by means of a suitable adhesive, preferably a hot melt adhesive such as the VITEL 3300 adhesive from Shell Chemical Company, 4040 Embassy Parkway, Akron, Ohio 44333, or a pressure sensitive adhesive such as 90/10 IOA/AA and 95/5 IOA/acrylamide acrylic PSAs from 3M Company, St. Paul, Minn. 55144.

The thickness of the transparent conductor applied to the multilayered polymer films to form the transparent multilayer devices of the present invention can be selected to provide the desired reflectivity. In general, the thinner the metal layer, the more light in the visible spectrum will be transmitted. However, because the electrical conductivity of the metal layer decreases as its thickness decreases, the amount of light reflected in the far infrared spectrum also decreases as the thickness of the metal layer decreases. Accordingly, by adjusting the thickness of the metal layer for any particular metal, metal alloy, or semiconductive metal oxide, the transparent conductor can provide the desired balance between transmission of light in the visible spectrum and reflection of light in the far infrared spectrum. Moreover, the thickness of the metal layer deposited on the multilayered polymer film can be monitored by measuring the metal layer's electrical conductivity.

Metals and metal alloys useful as transparent conductors in the present invention have electrical conductivities ranging between about 0.02 mhos/sq. to about 1.0 mhos/sq., preferably between about 0.05 mhos/sq. to about 1.0 mhos/sq., and may be applied in a thickness from about 10 nm to about 40 nm, preferably between about 12 nm to about 30 nm. Preferred semiconductive metal oxide layers have an electrical conductivity ranging between about 0.0001 mhos/sq. to about 0.1 mhos/sq., preferably between about 0.001 mhos/sq. to about 0.1 mhos/sq., and may be applied in a thickness from about 20 nm to about 200 nm, preferably from about 80 nm to about 120 nm. Where the transparent conductor is a metalized polymer or glass sheet laminated to the multilayered polymer film, the metal or metal alloy coatings on the sheet preferably have a thickness from about 10 nm to about 40 nm, while metal oxide coatings on the sheet preferably have a thickness from about 20 nm to about 200 nm.

Although thin metal transparent conductors, such as silver, may be sufficiently thin to have high visible transmissions, their reflectivity in the near infrared region between about 750 nm and about 2500 nm is not as good as compared to the reflectivity that can be achieved in that region by the multilayered polymer films used in the present invention. In contrast, the multilayered polymer films described above have high transmission of visible light and comparatively good reflection in the near infrared region with relatively low to poor reflectivity in the far infrared region. The multilayered polymer films are also generally capable of providing a sharper transition between visible and infrared light than the transparent conductors. Thus, the combination of the multilayered polymer film with the transparent conductor to form the transparent multilayer devices of the present invention provides better reflectivity throughout the entire infrared region while still transmitting visible light. In addition, antireflective coatings, which are well known to those of ordinary skill in the art, may be coated over the transparent conductor to increase the transmission of visible light. This includes, for example, an antireflective coating consisting of a metal, dielectric, metal stack with the individual layer thicknesses controlled to provide the desired visible transmission. However, such antireflective coatings are not required by the present invention to obtain the desired transmission of light in the visible spectrum.

The bandwidth of this reflectivity in the infrared region, however, is also dependent upon the level of transmission desired in the visible range since overtones and third order effects above about 1000 nm will undesirably increase reflection in the visible spectrum as is well known to those of ordinary skill in this art. One way to avoid significantly impacting deleteriously the transmission of visible light is to control the thicknesses of the individual layers in the multilayered polymer film as discussed above to limit the reflection band in the near infrared spectrum to a preselected range, such as between 750 nm and about 1000 nm where the solar spectrum is more intense than further out in the infrared spectra. In such an embodiment, the desired transmission in the visible spectrum will be maintained, and the combination of transparent conductor and multilayered polymer film will reflect the desired amount of light, with the multilayer film dominating the reflection in the near infrared from about 750 nm to about 1000 nm, and the transparent conductor dominating the reflection in the infrared spectrum above about 1000 nm. Other ways to achieve this result are also known in the art. See, for example, Alfred Thelen, "Multilayer Filters with Wide Transmittance Bands," J. Opt. Soc. Am. 53 (11), 1963, p. 1266, and Philip Baumeister, "Multilayer Reflections With Suppressed Higher Order Reflection Peaks," Applied Optics 31 (10), 1992, p. 1568.

The transparent multilayer devices of the present invention are largely uncolored and have a modest shading coefficient. The shading coefficient is the amount of solar energy that enters a window as compared to that of a simple pane of clear glass, and can be measured as shown in Example 10 below. In particular, when the multilayered polymeric film is combined with a transparent silver coating, its shading coefficient is lower than the shading coefficient of silver coated on a PET substrate. Although the appearance of a multilayered polymer film combined with a silver coating is similar in appearance and visible transmission to that of a silver coating on a PET film, the increased infrared reflection of the transparent multilayer devices of the present invention both reduces the solar transmission and increases the solar reflection, thereby resulting in a lower shading coefficient relative to the silver-coated PET film. The transparent multilayer devices of the present invention preferably have a shading coefficient of less than 0.5.

Figure 14:
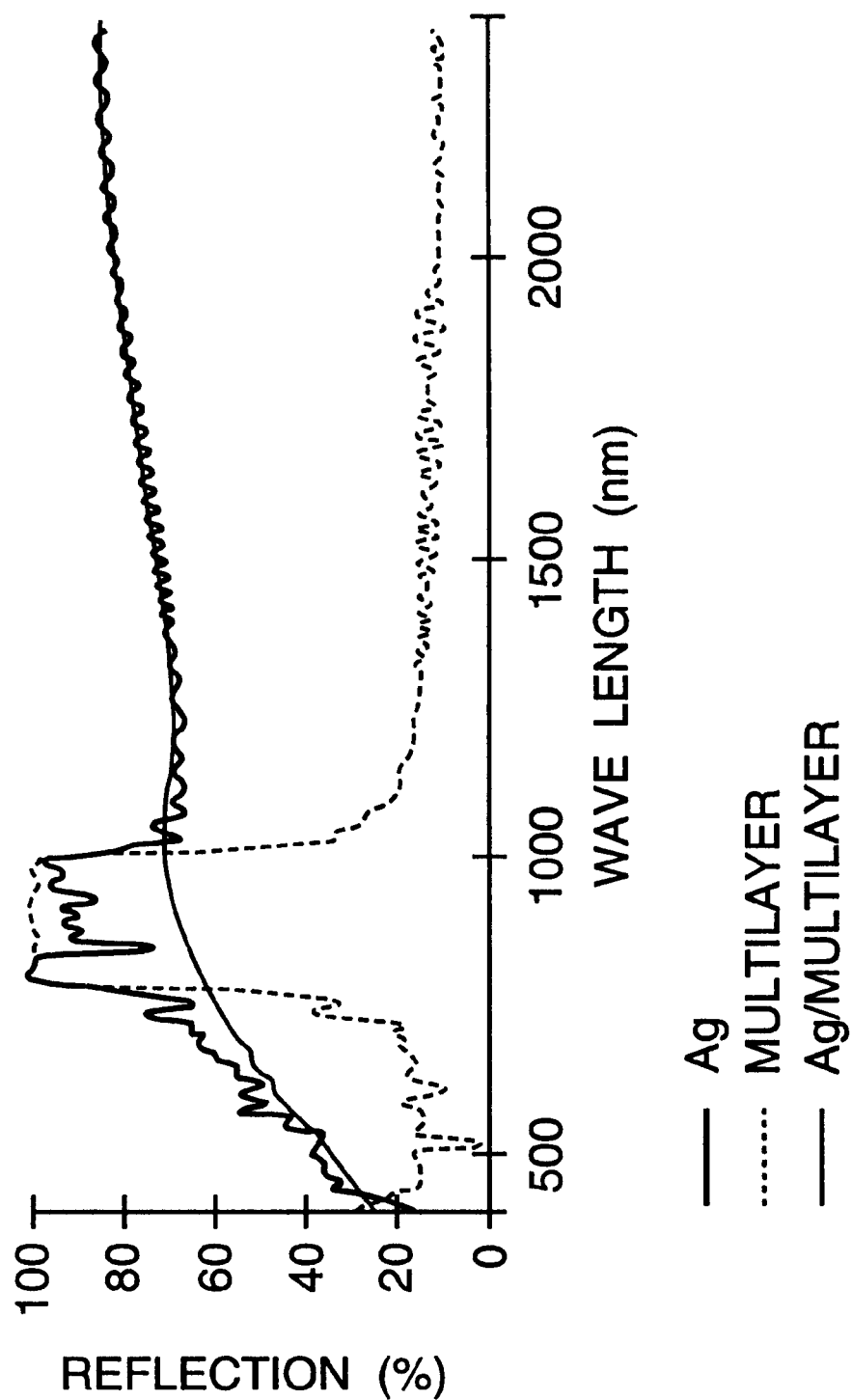
FIG. 14 shows the predicted optical performance of a modeled silver film, a modeled multilayered polymer film, and a modeled multilayered polymer film coated with a silver layer.

FIG. 14 shows the predicted optical performance of a modeled transparent multilayer device of the present invention as compared to a modeled silver film having a thickness of 13 nm and to a modeled multilayered polymer film without a transparent conductor. The modeled multilayered polymer film, both alone and combined with a silver film, consists of 603 alternating layers of PET and Ecdel with quarterwave optical thicknesses of 201 layers at 800 nm, 201 layers at 875 nm, and 201 layers at 950 nm. As shown in FIG. 14, such a multilayered polymer film provides nearly 100% reflection between about 750 nm and about 1050 nm, while the silver layer alone provides the desired reflectivity above about 1050 nm. In addition, such a transparent multilayer device would have a shading coefficient of about 0.36, which is a significant improvement over the shading coefficient of either the silver metal layer alone (0.45) or the multilayered polymer film alone (0.72).

By limiting the light transmitted to visible wavelengths and keeping out light in the infrared region, the transparent multilayer device of the present invention aids in reducing required cooling in summer and heating in winter. Consequently, such devices can be used by applying them directly to the surface of a glass or plastic substrate, such as an exterior window in a building or the windshield or window of an automobile, truck or aircraft. It is also suitable for laminated glass and plastic articles in which at least one transparent multilayer device is sandwiched between pairs of glass or plastic panes. Other uses would be apparent to those of ordinary skill in this art where protection is desired from infrared radiation while still obtaining substantial transparency to light in the visible region of the spectrum, such as, for example, applying the transparent multilayer device of the present invention to the window in a door to a refrigerated display case.

When the transparent multilayer devices of the present invention are applied to a window in a house or automobile to reflect solar heat, such as during the summer, preferably the transparent conductor is next to the interior surface of the window and the multilayered polymer film faces the house or automobile interior. The outer surface of the multilayered polymer film may be covered by an abrasion resistant coating, as is well known in the art, while a colored film to reduce reflection of visible light may be applied to the outer surface of the transparent conductor by means of a laminating adhesive, e.g., the VITEL 3300 hot melt adhesive sold by Shell Chemical Company in Akron, Ohio, or a pressure sensitive adhesive such as 90/10 IOA/AA or 95/5 IOA/acrylamide acrylic PSAs from 3M Company, St. Paul, Minn. Where it is desired to reflect radiant heat from the room back into the room during colder weather, the transparent conductor is preferably positioned facing the room or automobile interior, and is preferably covered by a protective polyolefin film, such as, for example, a polypropylene film, to maintain the reflectance in the far infrared region. Such constructions are well known to those of ordinary skill in the art. If the transparent multilayer devices of the present invention are used on the exterior of such windows, durability of the device is a concern. Accordingly, a protective UV-stabilized polyester or acrylic film layer may be laminated directly to the transparent conductor to avoid exposing the metal layer to the environment.

The transparent multilayer devices of the present invention have desirable optical properties in that they reflect the desired amount of light in the infrared region of the spectrum while transmitting sufficient light in the visible region of the spectrum to be transparent. Thus, they control the amount of solar energy that passes through the device without significantly decreasing the intensity of light sensed by the human eye. Preferably, at least about 20% to about 80% of the light in the visible region of the spectrum is transmitted through the device, while at least about 30% of the light in the infrared region is reflected, more preferably at least about 80% is reflected, and most preferably more than about 95% of the light in the infrared region is reflected.

In order to more fully and clearly describe the present invention so that those skilled in the art may better understand how to practice the present invention, the invention will now be described by way of the following examples. In the examples, because optical absorption is negligible, reflection equals 1 minus transmission (R=1−T). The examples are intended to illustrate the invention and should not be construed as limiting the invention disclosed and claimed herein in any manner.

EXAMPLE 1

(PET:Ecdel, 601, Mirror)

A coextruded film containing 601 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method (such as that described in U.S. Pat. No. 3,801,429) was used to generate 151 layers which was passed through two multipliers producing an extrudate of 601 layers. U.S. Pat. No. 3,565,985 describes exemplary coextrusion multipliers. The web was length oriented to a draw ratio of about 3.6 with the web temperature at about 210° F. The film was subsequently preheated to about 235° F. in about 50 seconds and drawn in the transverse direction to a draw ratio of about 4.0 at a rate of about 6% per second. The film was then relaxed about 5% of its maximum width in a heat-set oven set at 400° F. The finished film thickness was 2.5 mil.

Figure 3:
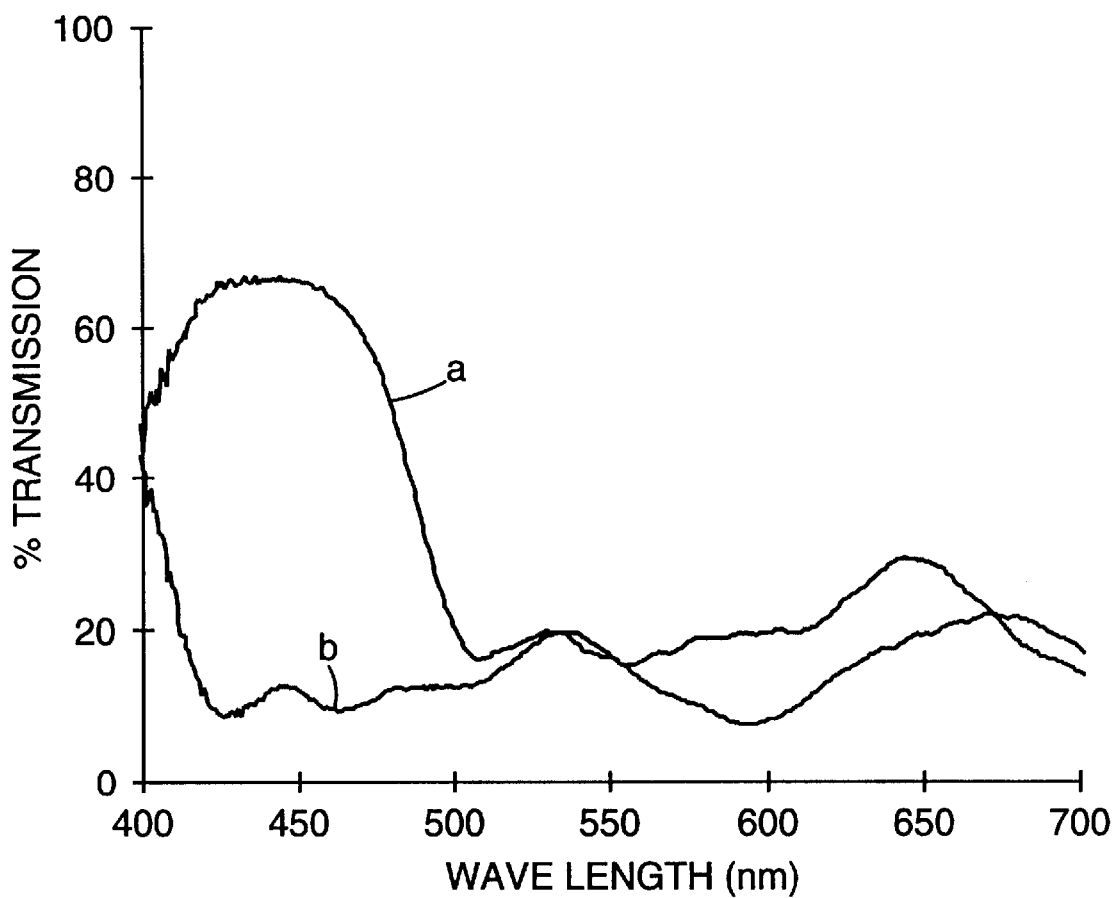
FIGS. 3–8 show the optical performance of multilayer mirrors given in Examples 1–4.

The cast web produced was rough in texture on the air side, and provided the transmission as shown in FIG. 3. The % transmission for p polarized light polarized in the non-stretched direction at a 60° angle (curve b) is similar the value at normal incidence (curve a) (with a wavelength shift).

Figure 4:
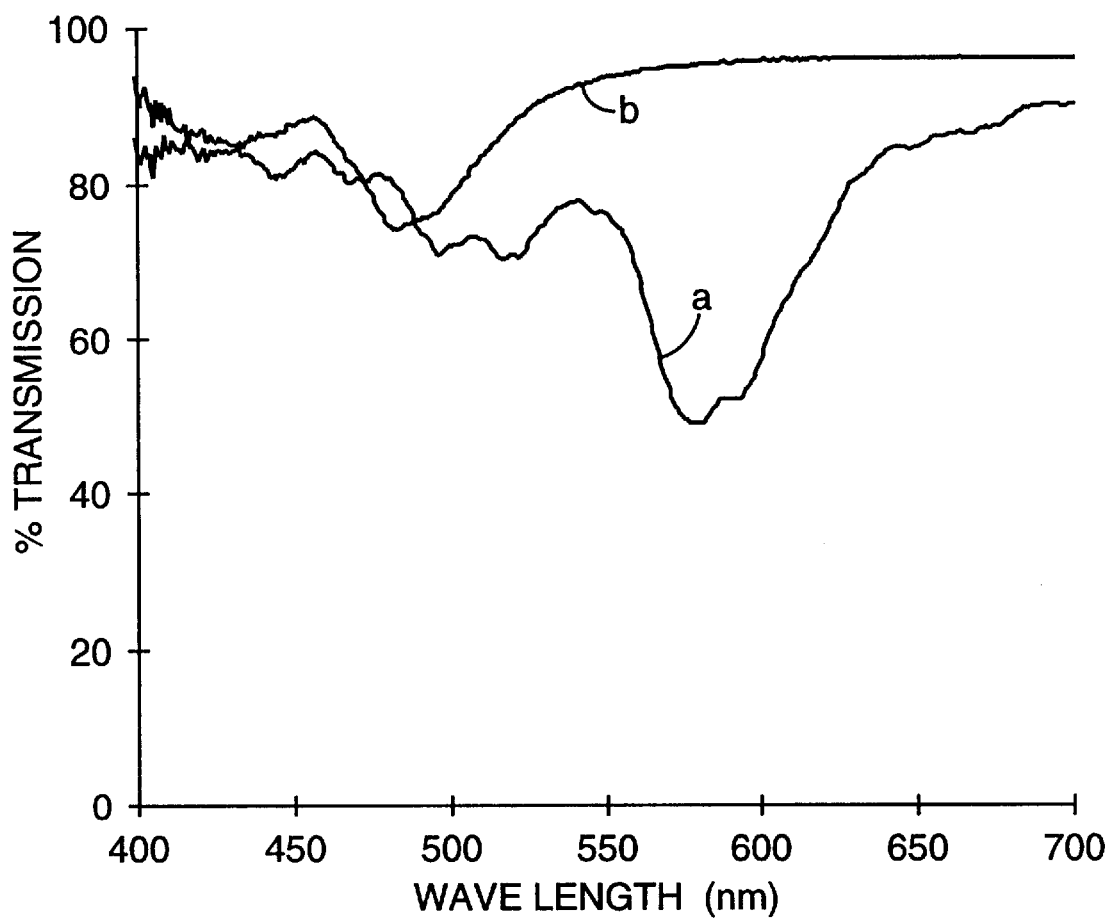

For comparison, film made by Mearl Corporation, presumably of relatively isotropic materials (see FIG. 4) shows a noticeable loss in reflectivity for p polarized light at a 60° angle (curve b, compared to curve a for normal incidence).

EXAMPLE 2

(PET:Ecdel, 151, Mirror)

A coextruded film containing 151 layers was made on a sequential flat-film-making line via a coextrusion process. A polyethylene terephthalate (PET) with an Intrinsic Viscosity of 0.6 dl/g (60 wt phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method was used to generate 151 layers. The web was length oriented to a draw ratio of about 3.5 with the web temperature at about 210° F. The film was subsequently preheated to about 215° F. in about 12 seconds and drawn in the transverse direction to a draw ratio of about 4.0 at a rate of about 25% per second. The film was then relaxed about 5% of its maximum width in a heat-set oven set at 400° F. in about 6 seconds. The finished film thickness was about 0.6 mil.

Figure 5:
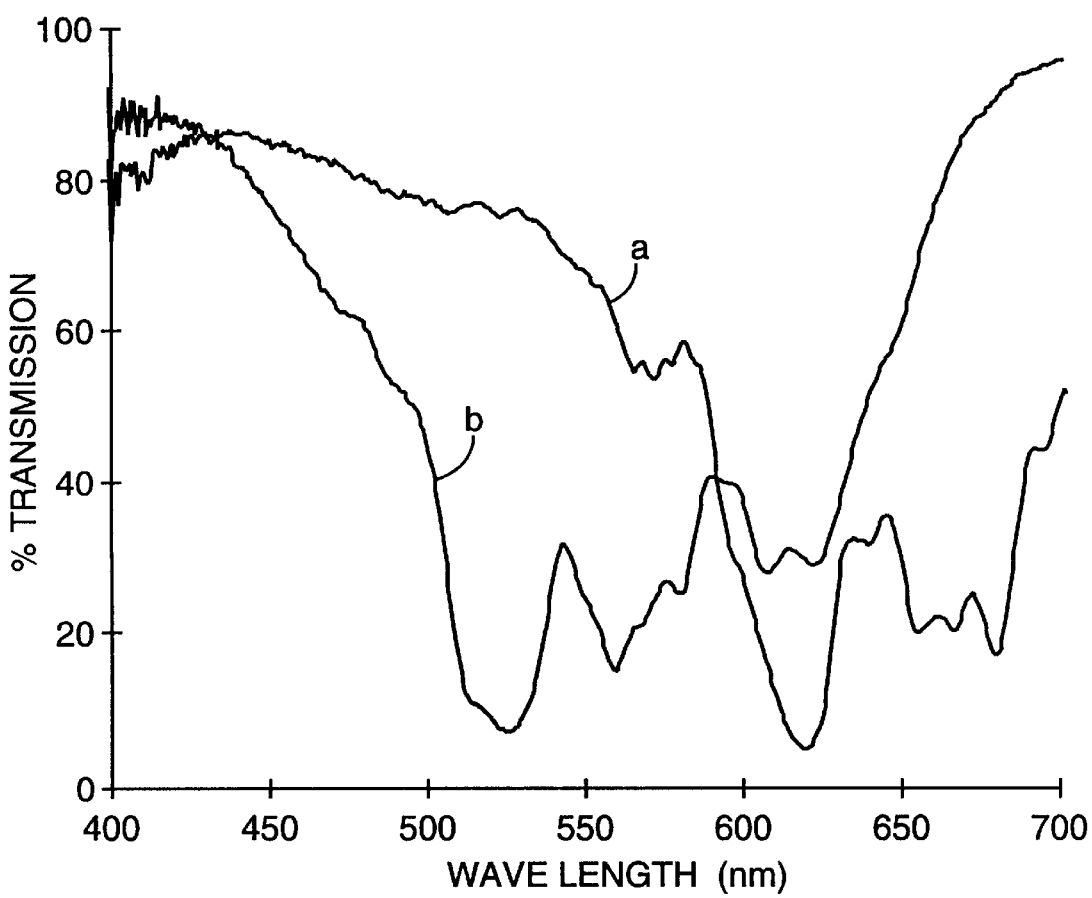
Figure 6:
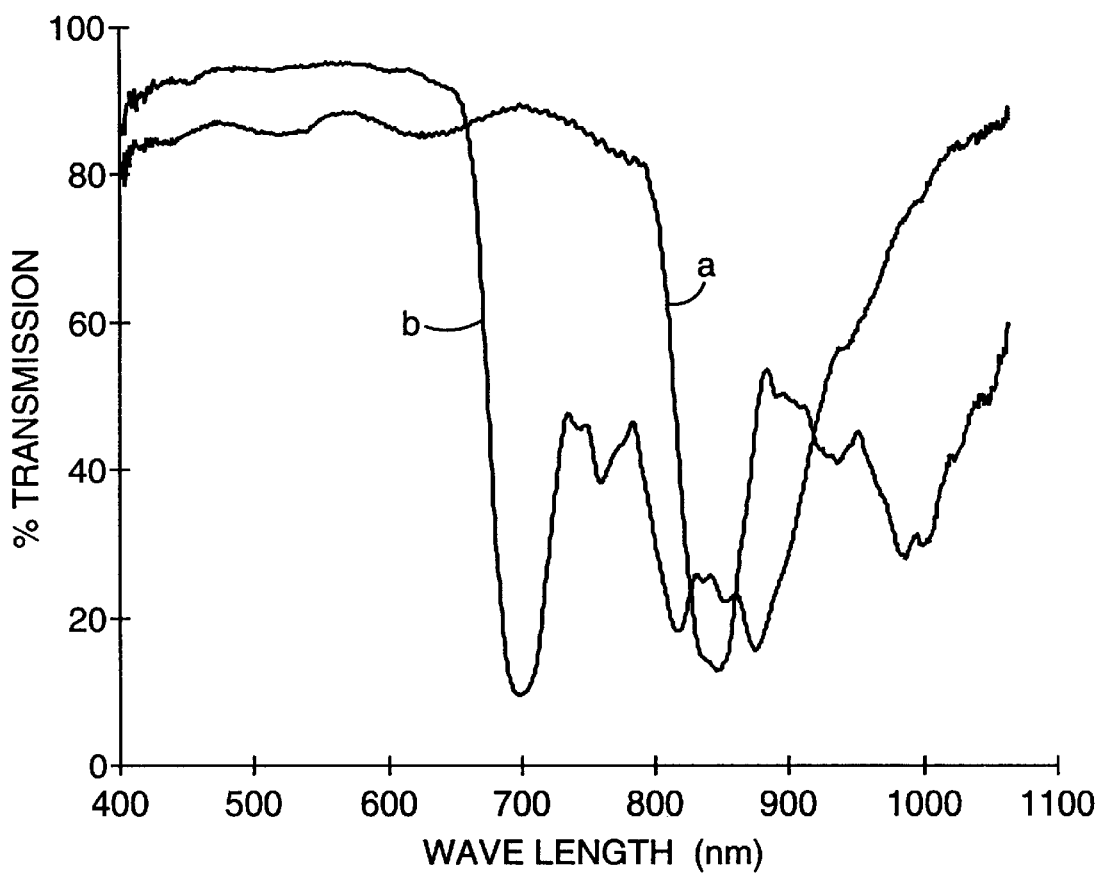

The transmission of this film is shown in FIG. 5. The % transmission for p polarized light polarized in the non-stretched direction at a 60° angle (curve b) is similar the value at normal incidence (curve a) with a wavelength shift. At the same extrusion conditions the web speed was slowed down to make an infrared reflecting film with a thickness of about 0.8 mils. The transmission is shown in FIG. 6 (curve a at normal incidence, curve b at 60 degrees).

EXAMPLE 3

(PEN:Ecdel, 225, Mirror)

A coextruded film containing 225 layers was made by extruding the cast web in one operation and later orienting the film in a laboratory film-stretching apparatus. A polyethylene naphthalate (PEN) with an Intrinsic Viscosity of 0.5 dl/g (60 wt. % phenol/40 wt. % dichlorobenzene) was delivered by one extruder at a rate of 18 pounds per hour and Ecdel 9966 (a thermoplastic elastomer available from Eastman Chemical) was delivered by another extruder at a rate of 17 pounds per hour. The PEN was on the skin layers. The feedblock method was used to generate 57 layers which was passed through two multipliers producing an extrudate of 225 layers. The cast web was 12 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 130° C. in 60 seconds. Stretching then commenced at 100%/sec (based on original dimensions) until the sample was stretched to about 3.5×3.5. Immediately after the stretching the sample was cooled by blowing room temperature air on it.

Figure 7:
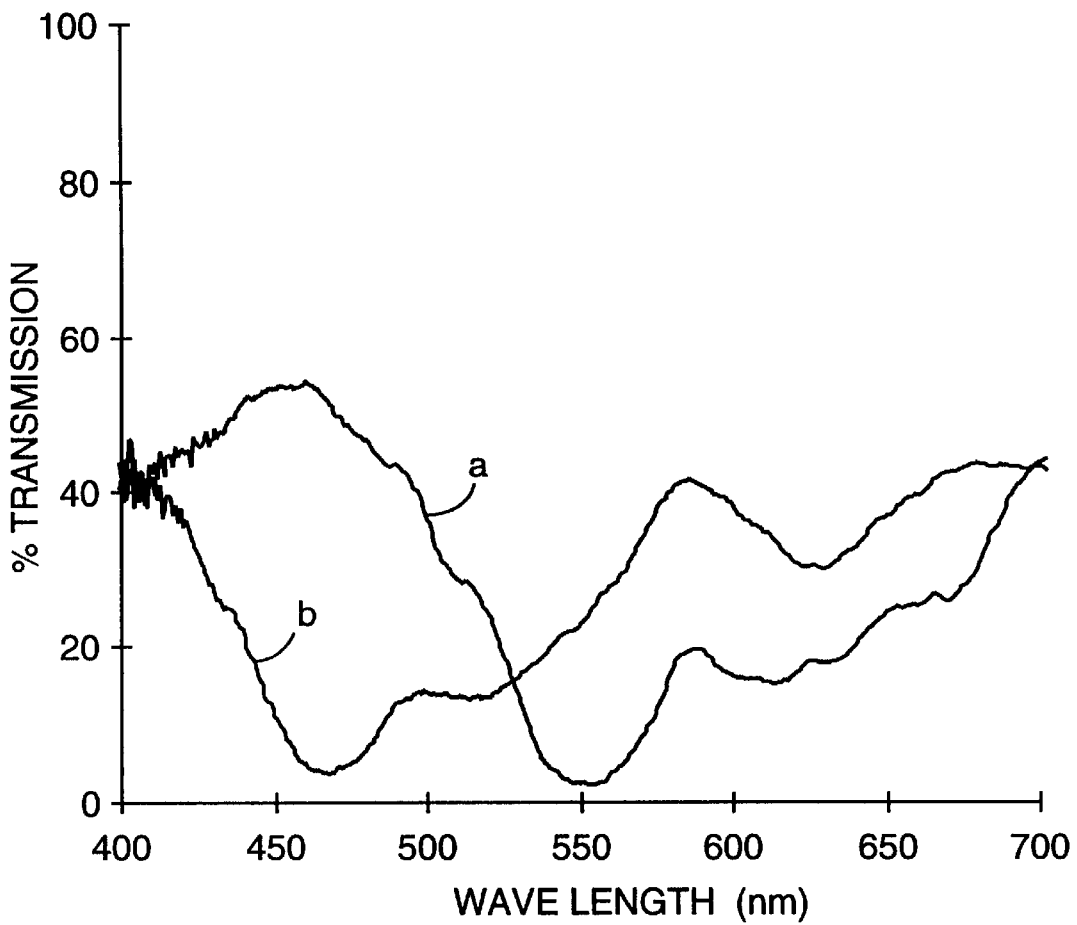

FIG. 7 shows the optical response of this multilayer film (curve a at normal incidence, curve b at 60 degrees). Note that the % transmission for p polarized light polarized in the non-stretched direction at a 60° angle is similar to what it is at normal incidence (with some wavelength shift).

EXAMPLE 4

(PEN:THV 500, 449, Mirror)

A coextruded film containing 449 layers was made by extruding the cast web in one operation and later orienting the film in a laboratory film-stretching apparatus. A polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 8:
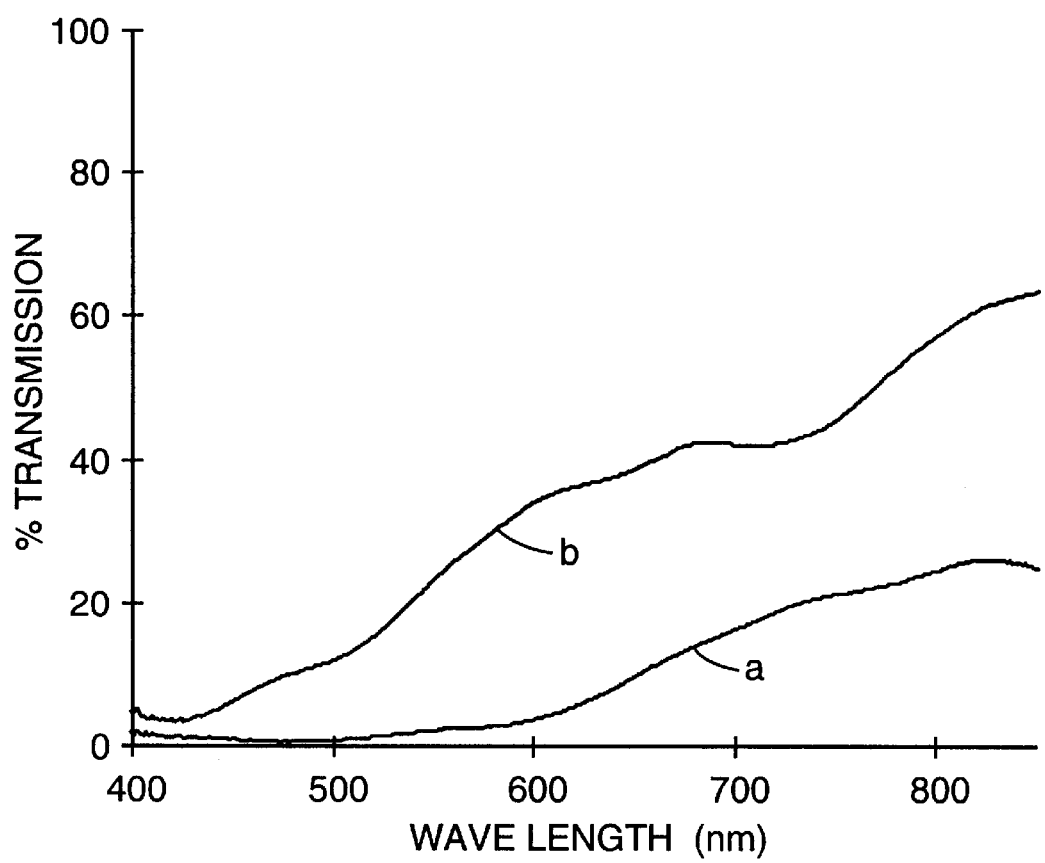

FIG. 8 shows the transmission of this multilayer film. Again, curve a shows the response at normal incidence, while curve b shows the response at 60 degrees for p-polarized light polarized in the non-stretched direction.

EXAMPLE 5

(PEN:coPEN, 601—High Color Polarizer)

A coextruded film containing 601 layers was produced by extruding the web and two days later orienting the film on a different tenter than described in all the other examples. A polyethylene naphthalate (PEN) with an Intrinsic Viscosity of 0.5 dl/g (60 wt. % phenol/40 wt. % dichlorobenzene) was delivered by one extruder at a rate of 75 pounds per hour and a coPEN (70 mol % 2,6 NDC [a methyl ester of naphthalene dicarboxylic acid] and 30 mol % DMT [dimethyl terephthalate]) with an IV of 0.55 dl/g (60 wt. % phenol/40 wt. % dichlorobenzene) was delivered by another extruder at a rate of 65 pounds per hour. The feedblock method was used to generate 151 layers, and was designed to produce a gradient distribution of layers with a ratio of thickness of the optical layers of 1.22 for PEN and 1.22 for coPEN. The PEN skin layers were coextruded on the outside of the optical stack with a total thickness of about 8% of the coextruded layers. The optical stack was passed through two multipliers producing an extrudate of 601 layers. U.S. Pat. No. 3,565,985 describes similar coextrusion multipliers. All stretching was done in the tenter. The film was preheated to about 280° F. in about 20 seconds and drawn in the transverse direction to a draw ratio of about 4.4 at a rate of about 6% per second. The film was then relaxed about 2% of its maximum width in a heat-set oven set at 460° F. The finished film thickness was 1.8 mil.

Figure 9:
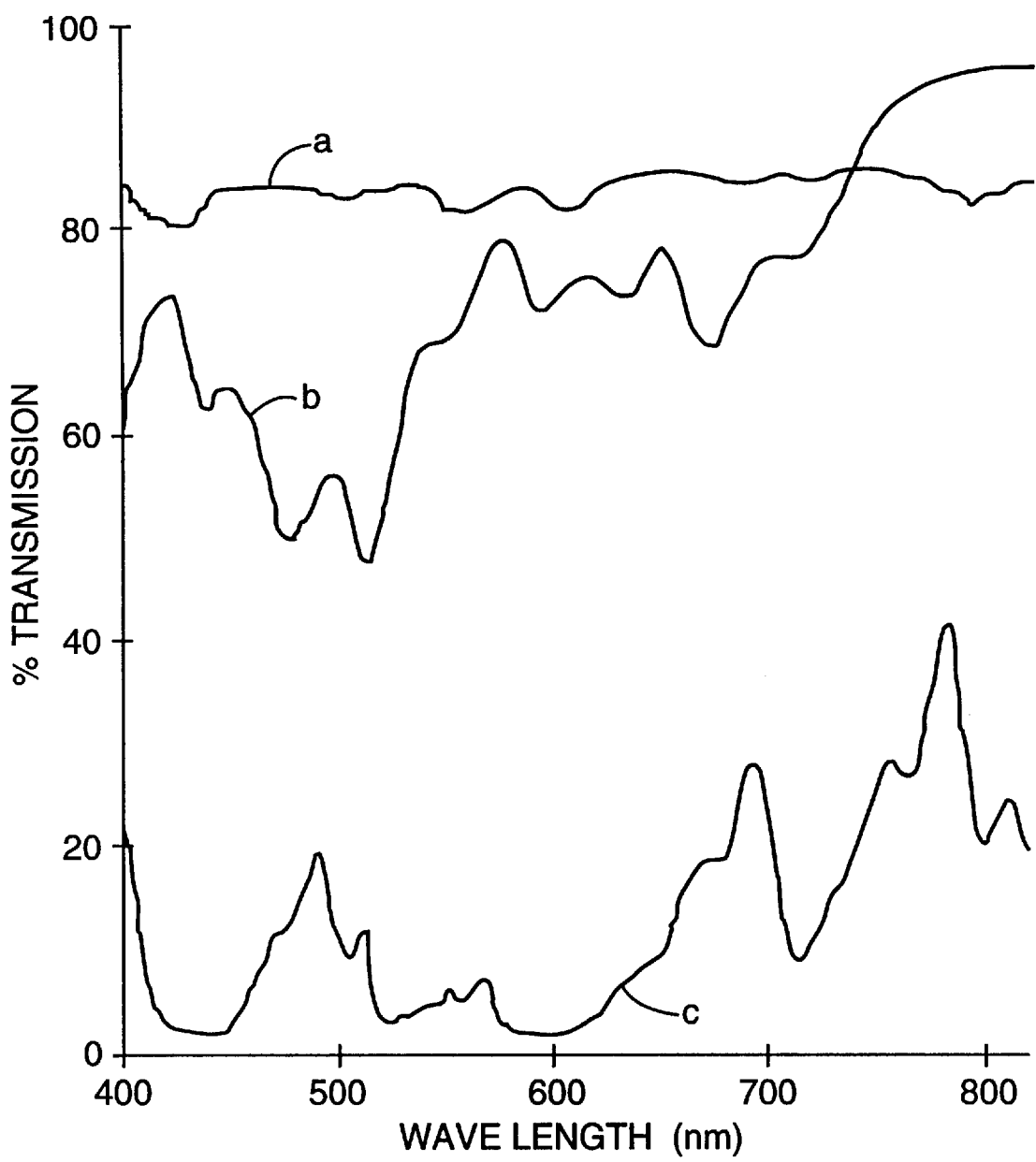
FIGS. 9–11 show the optical performance of multilayer polarizers given in Examples 5–7.

The transmission of the film is shown in FIG. 9. Curve a shows transmission of light polarized in the non-stretch direction at normal incidence, curve b shows transmission of p polarized light polarized in the non-stretched direction at 60° incidence, and curve c shows transmission of light polarized in the stretch direction at normal incidence. Note the nonuniform transmission of p polarized light at both normal and 60° incidence. The average transmission for curve a over 400–700 nm is 84.1%, while the average transmission for curve b over 400–700 nm is 68.2%. The average transmission for curve c is 9.1%. The % RMS color for curve a is 1.4%, and the % RMS color for curve b is 11.2%.

EXAMPLE 6

(PEN:coPEN, 601, Polarizer)

A coextruded film containing 601 layers was made on a sequential flat-film-making line via a coextrusion process. A polyethylene naphthalate (PEN) with an Intrinsic Viscosity of 0.54 dl/g (60 wt % phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene decarboxylate methyl ester, 15% dimethyl isophthalate and 15% dimethyl terephthalate with ethylene glycol. The feedblock method was used to generate 151 layers. The feedblock was designed to produce a gradient distribution of layers with a ratio of thickness of the optical layers of 1.22 for the PEN and 1.22 for the coPEN. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 10:
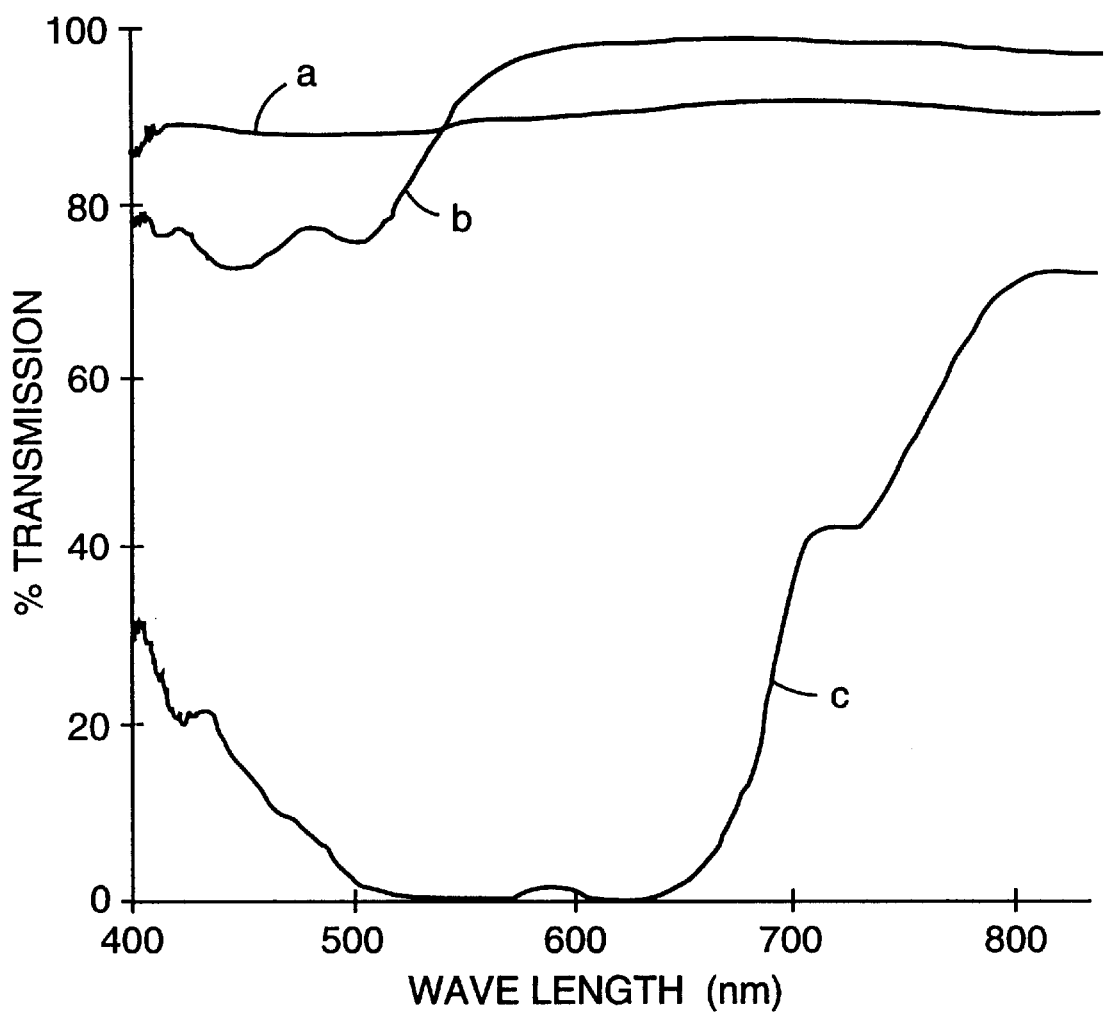

FIG. 10 shows the transmission for this multilayer film. Curve a shows transmission of light polarized in the non-stretch direction at normal incidence, curve b shows transmission of p polarized light polarized in the non-stretched direction at 60° incidence, and curve c shows transmission of light polarized in the stretch direction at normal incidence. Note the very high transmission of p polarized light at both normal and 60° incidence (80–100%). Also note the very high extinction of light polarized in the stretched direction in the visible range (400–700 nm) shown by curve c. Extinction is nearly 100% between 500 and 650 nm.

EXAMPLE 7

(PEN:sPS, 481, Polarizer)

A 481 layer multilayer film was made from a polyethylene naphthalate (PEN) with an intrinsic viscosity of 0.56 dl/g (60 wt. % phenol and 40 wt % dichlorobenzene) purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2x) multipliers were used. Equal thickness skin layers containing the same PEN fed to the feedblock were added after the final multiplier at a total rate of 22 pounds per hour. The web was extruded through a 12" wide die to a thickness or about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 11:
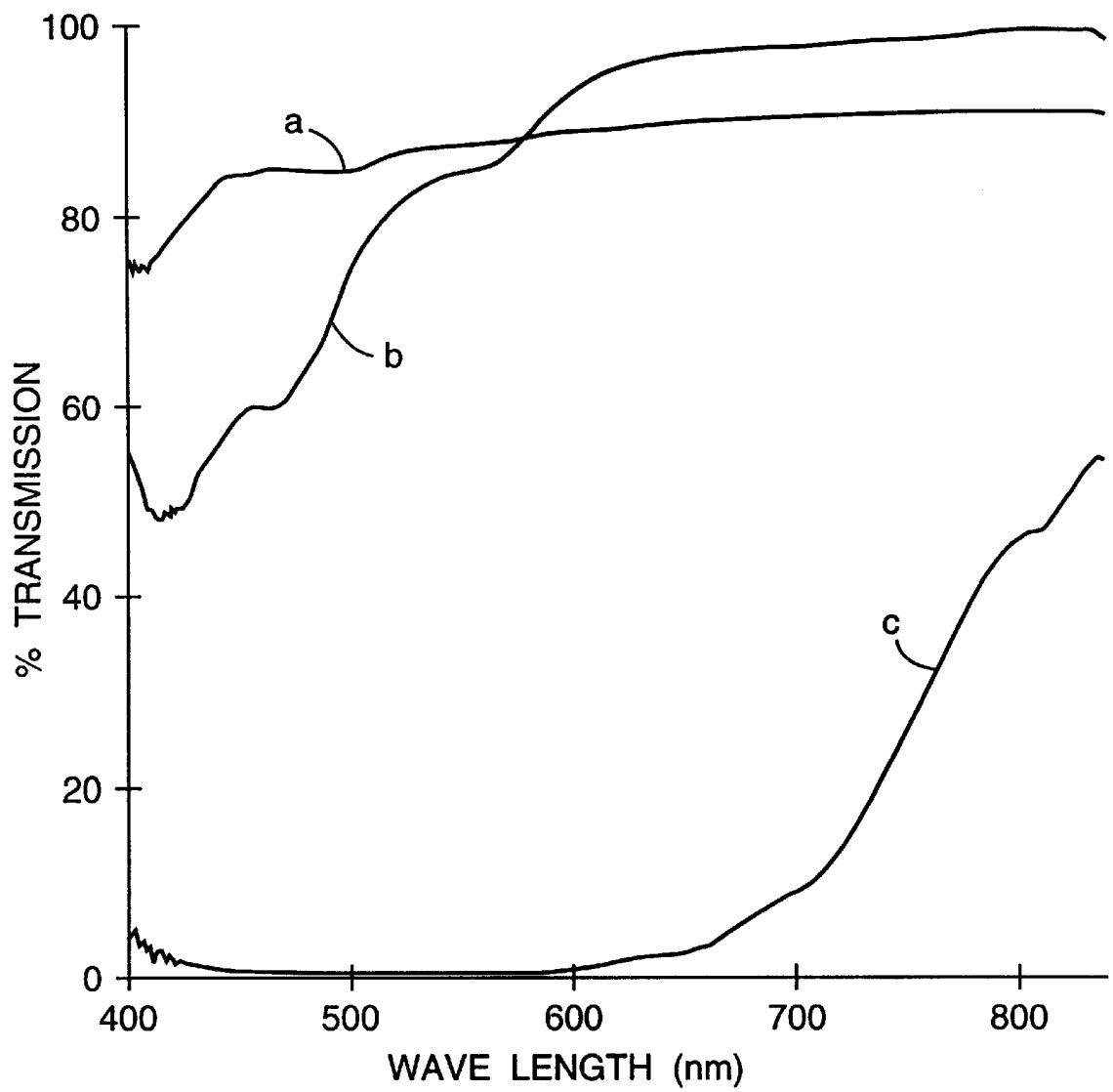

FIG. 11 shows the optical performance of this PEN:sPS reflective polarizer containing 481 layers. Curve a shows transmission of light polarized in the non-stretch direction at normal incidence, curve b shows transmission of p polarized light polarized in the non-stretched direction at 60° incidence, and curve c shows transmission of light polarized in the stretch direction at normal incidence. Note the very high transmission of p polarized light at both normal and 60° incidence. Average transmission for curve a over 400–700 nm is 86.2%, the average transmission for curve b over 400–700 nm is 79.7%. Also note the very high extinction of light polarized in the stretched direction in the visible range (400–700 nm) shown by curve c. The film has an average transmission of 1.6% for curve c between 400 and 700 nm.

The % RMS color for curve a is 3.2%, while the % RMS color for curve b is 18.2%.

EXAMPLE 8

(PET:Ecdel, 601, Mirror)

A coextruded film containing 601 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered to the feedblock at a rate of 75 pounds per hour and Ecdel 9967 (a thermoplastic elastomer available from Eastman Chemical) was delivered at a rate of 60 pounds per hour. The PET was on the skin layers. The feedblock method was used to generate 151 layers which was passed through two multipliers producing an extrudate of 601 layers. The multipliers had a nominal multiplication ratio of 1.2 (next to feedblock) and 1.27. Two skin layers at a total throughput of 24 pounds per hour were added symmetrically between the last multiplier and the die. The skin layers were composed of PET and were extruded by the same extruder supplying the PET to the feedblock. The web was length oriented to a draw ratio of about 3.3 with the web temperature at about 205° F. The film was subsequently preheated to about 205° F. in about 35 seconds and drawn in the transverse direction to a draw ratio of about 3.3 at a rate of about 9% per second. The film was then relaxed about 3% of its maximum width in a heat-set oven set at 450° F. The finished film thickness was about 0.0027 inches.

Figure 12:
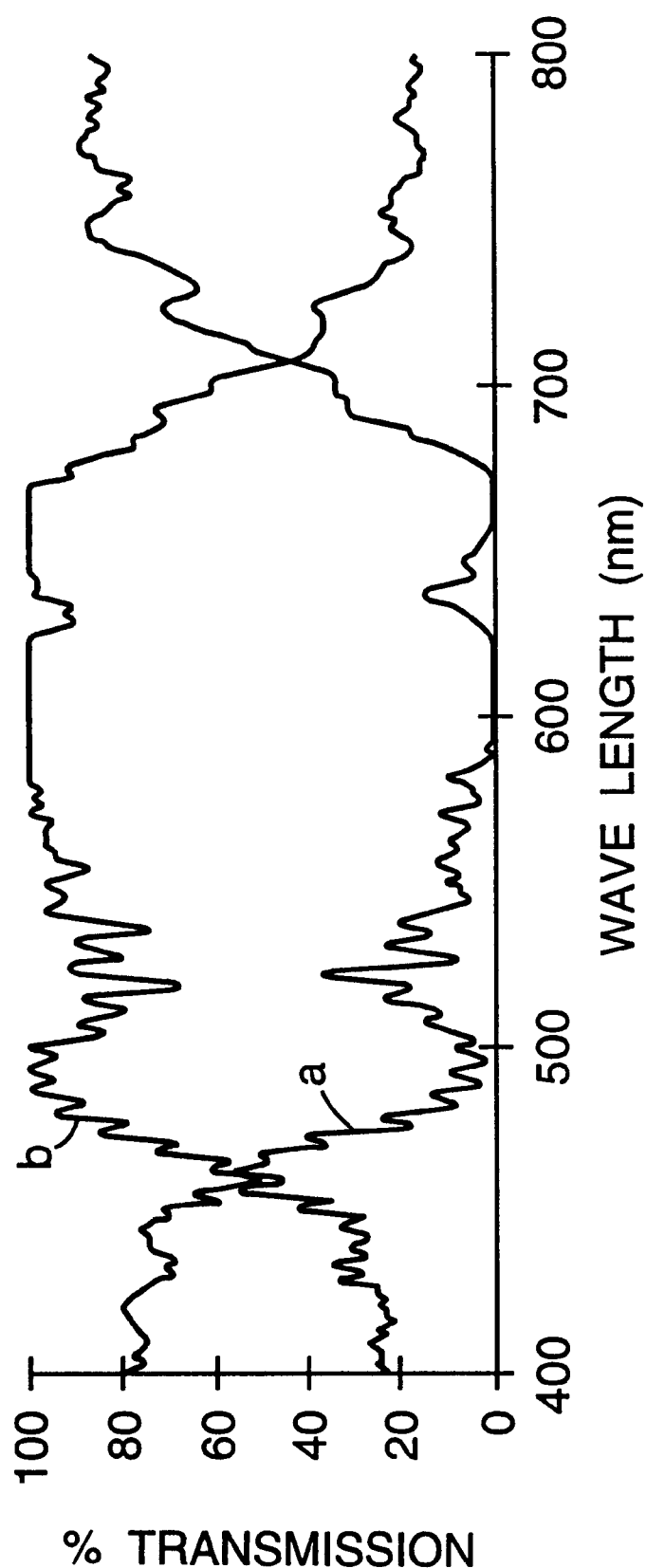
FIG. 12 shows the optical performance of the multilayer mirror given in Example 8.

The film provided the optical performance as shown in FIG. 12. Transmission is plotted as curve a and reflectivity is plotted as curve b. The luminous reflectivity for curve b is 91.5%.

EXAMPLE 9

(PEN:PCTG, 481, Polarizer)

A coextruded film containing 481 layers was made by extruding the cast web in one operation and later orienting the film in a laboratory film-stretching apparatus. The feedblock method was used with a 61 layer feedblock and 3 (2x) multipliers. Thick skin layers were added between the final multiplier and the die. Polyethylene naphthalate (PEN) with an Intrinsic Viscosity of 0.47 dl/g (60 wt. % phenol/40 wt. % dichlorobenzene) was delivered to the feedblock by one extruder at a rate of 25.0 pounds per hour. Glycol modified polyethylene dimethyl cyclohexane terephthalate (PCTG 5445 from Eastman Chemical) was delivered by another extruder at a rate of 25.0 pounds per hour. PEN was on the skin layers. Another stream of PEN from the above extruder was added as skin layers at a rate of 25 pounds per hour. The cast web was 0.007 inches thick and 12 inches wide. The web was later uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching then commenced at 20%/sec (based on original dimensions) until the sample was stretched to about 6:1 (based on gripper-to-gripper measurements). Immediately after stretching, the sample was cooled by blowing room temperature air at it. In the center of the sample the film was found to relax by a factor of 2.0.

Figure 13:
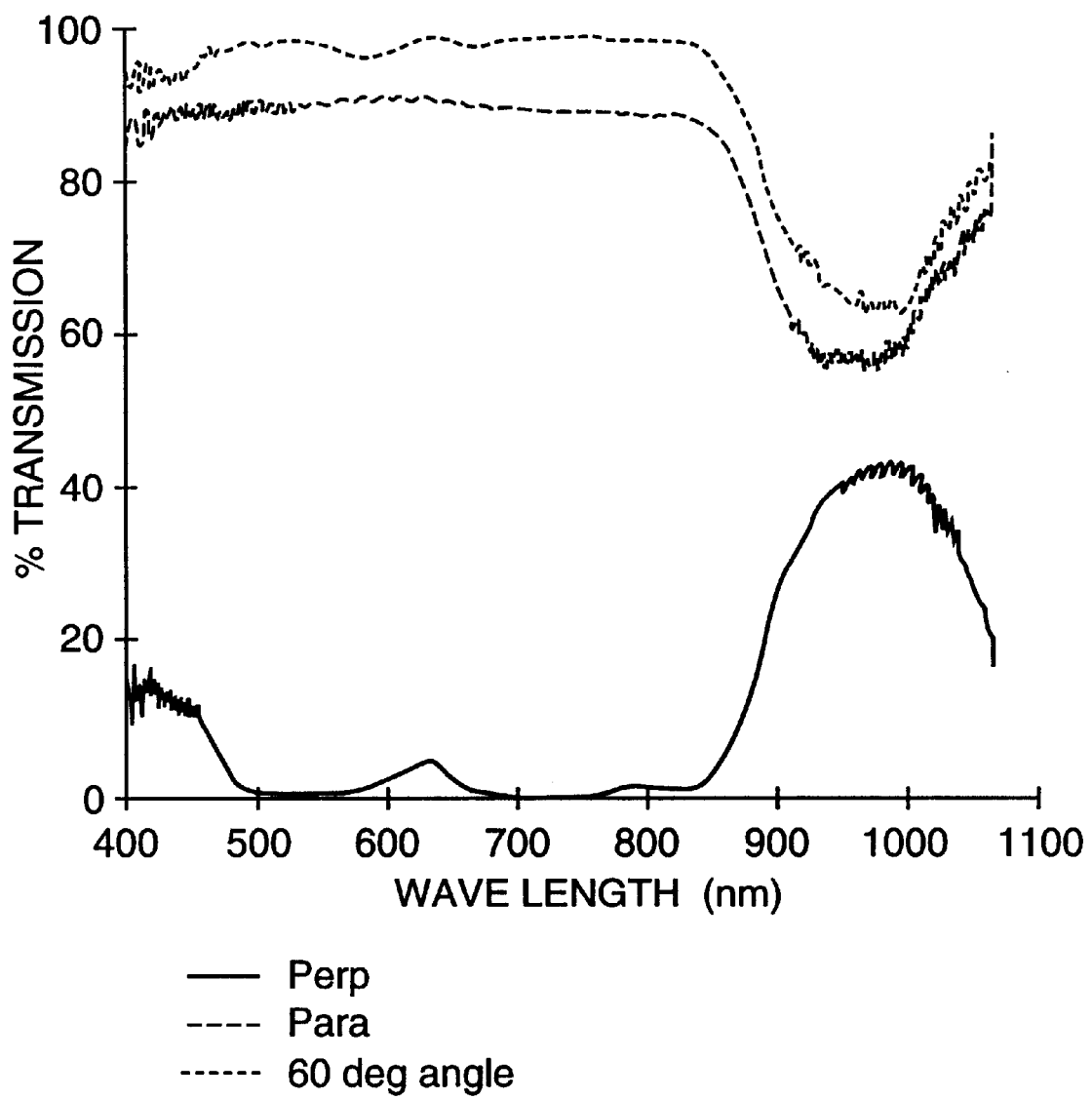
FIG. 13 shows the optical performance of the multilayer polarizer given in Example 9.

FIG. 13 shows the transmission of this multilayer film where curve a shows transmission of light polarized in the non-stretch direction at normal incidence, curve b shows transmission of p polarized light polarized in the non-stretch direction at 60° incidence, and curve c shows transmission of light polarized in the stretch direction at normal incidence.

EXAMPLE 10

(PET:Ecdel, 150, Ag)

A coextruded film containing 151 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered to a feedblock by one extruder at a rate of 75 pounds per hour and Ecdel 9966 (a thermoplastic elastomer available from Eastman Chemical) was delivered to the feedblock by another extruder at a rate of 65 pounds per hour. The feedblock method was used to generate 151 layers with a casting wheel speed of 20 ft/min. The skin layers were PET and were thicker than the internal layers, with the skin layers accounting for about 8% of the film's thickness. The web was length oriented to a draw ratio of about 3.5 with the web temperature at about 210° F. The film was subsequently preheated to about 215° F. in about 12 seconds and drawn in the transverse direction to a draw ratio of about 4.0 at a rate of about percent per second. The film was then relaxed about 5% of its maximum width in a heat-set oven set at 400° F. in about 6 seconds. The finished film thickness was about 0.6 mil.

This multilayered polymer film was coated with silver sputtered from an Airco 373 cathode onto an unsupported web using a sputter pressure of 4.5 microns of argon. The application of 300 watts to the target resulted in a voltage of 519 volts and a current of 0.60 amps. Using a web speed of 10 feet per minute, the silver layer was coated onto the multilayered polymer film to a transmission level of 53% at 550 nm and a conductivity of 0.15 mhos/sq.

A 2 mil polyethylene terephthalate film available from the Minnesota Mining and Manufacturing Company, Product No. 597197P56, was coated with silver sputtered from an Airco 373 cathode onto an unsupported web in the same manner and using the same conditions as with the above multilayered polymer film.

The silver-coated multilayered polymer film and the silver-coated PET film were characterized by measuring their optical spectra reflection in a Perkin Elmer λ-9. The measured sample transmission spectra is multiplied by the sensitivity function of the human eye integrated over the visible spectrum and is referred to as $T_{1um}$. The measured sample reflection ($R_{AM2}$) and transmission spectra ($T_{AM2}$) are integrated over air mass 2 solar spectrum according to ASTM E903, "Standard Test For Solar Absorbance, Reflectance, and Transmittance of Materials Using Integrating Spheres." The dominant wavelength is the apparent color of the sample that is calculated with CIE techniques using Illuminant C and the 10° observer according to ASTM E308, "Standard Test Method for Computing The Colors of Objects Using the CIE System." The color purity is the saturation of the color, with 0% being white and 100% being a pure color. The shading coefficient is calculated from the air mass 2 integrated R and T spectra of the silver-coated multilayered polymer film by the following formula:

$$SC = \frac{T^f_{AM2} + f \times (100 - T^f_{AM2} - R^f_{AM2})}{T^g_{AM2} + f \times (100 - T^g_{AM2} - R^g_{AM2})}$$

where f is the inward flowing fraction of the absorbed solar energy.

The results of the optical characterization are shown in Table I below. The visible transmitted intensity for both the silver-coated multilayered polymer film and the silver-coated PET are similar, 58% versus 57%. Their transmitted colors were both a light blue with less than 10% purity. The lower solar transmission and higher solar reflection for the silver-coated multilayered polymer film results in a decrease in the shading coefficient from 0.50 for the silver-coated PET to 0.43. This means that the silver-coated multilayered polymer film of the present invention provides a significant difference in thermal performance without a noticeable change in visual appearance.

TABLE I

| Sample | $T_{lum}$ (%) | $T_{AM2}$ (%) | $R_{AM2}$ (%) | Shading Coefficient | Dominant Wavelength (mn.) | Color Purity (%) |
|---|---|---|---|---|---|---|
| Multilayer Optical Film | 86.1 | 74.6 | 25 | 0.81 | 599 | 1 |
| Ag coated Multilayer Optical Film | 58.4 | 38.2 | 54.8 | 0.43 | 474 | 8.1 |
| Ag coated PET | 56.7 | 42.1 | 40.6 | 0.5 | 475 | 9.4 |

Figure 15:
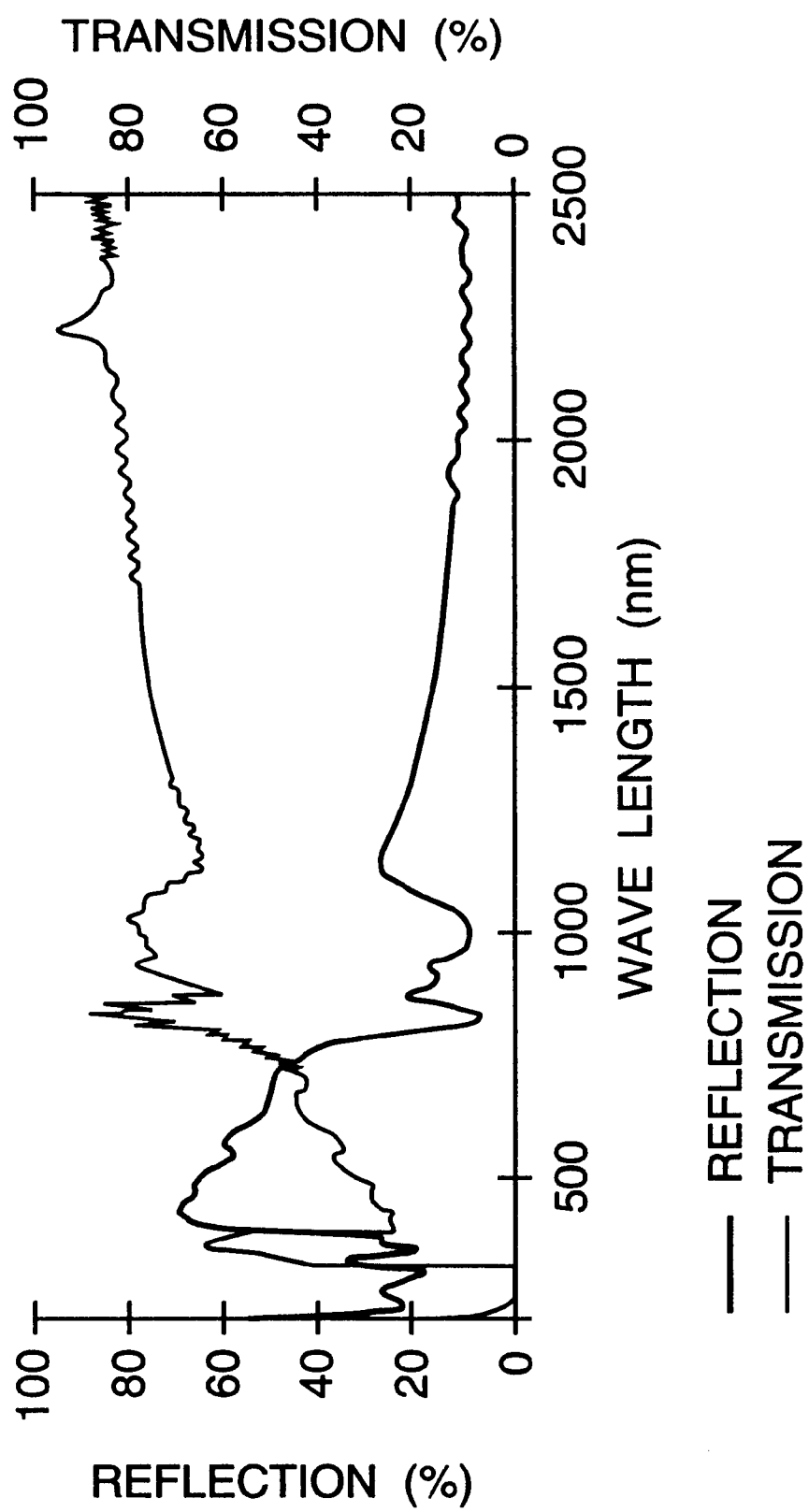
FIG. 15 shows the optical performance of the transparent multilayer device of Example 10.

FIG. 15 shows the optical performance of the silver-coated multilayered polymer film of Example 10. The high reflection above 1500 nm is due to the silver coating while the reflection in the spectral region below 1250 nm is due to the multilayered polymer film.

EXAMPLE 11

(PET: Ecdel, 150, Silver Scotchtint® Film)

A coextruded film containing 151 layers was made on a sequential flat-film-making line via a coextrusion process according to Example 1, with skin layers coextruded on the outside of the optical stack with a total thickness of about 14% of the coextruded layers.

This multilayered polymer film was laminated to a Scotchtint® silver coated film available from 3M Company, St. Paul, Minn., as Scotchtint® Film IN50BR, using a 95/5 IOA/acrylamide acrylic pressure sensitive adhesive from 3M Company, St. Paul, Minn., which is commonly used on Scotchtint® films.

Three samples were prepared consisting of the multilayered IR film adhered to ¼ inch clear glass using 95/5 IOA/acrylamide acrylic PSA; Scotchtint® Film IN5OBR adhered to ¼ inch clear glass using 95/5 IOA/acrylamide acrylic PSA; and multilayer IR film adhered to ¼ inch clear glass and subsequently applied to Scotchtint® IN50BR Film using the 95/5 IOA/acrylamide acrylic PSA to form a multilayer IR film/Scotchtint® Film laminate, and these samples were characterized by measuring their optical spectra reflection in a Perkin Elmer λ-9 as described in Example 10.

The results of the optical characterization are shown in Table II below. The visible transmitted intensity for the multilayered polymer film is better than the and the Scotchtint® IN50BR Film, 75% versus 50%, and the multilayer film/Scotchtint® laminate is only slightly worse at 45%, but there is a significant improvement in shading coefficient at 0.30 for the laminate compared to 0.62 and 0.39 for the multilayer film and Scotchtint® film, respectively. Their transmitted colors were both a light blue with less than 10% purity.

TABLE II

| Sample | $T_{lum}$ (%) | $T_{AM2}$ (%) | $R_{AM2}$ (%) | Shading Coefficient | Dominant Wavelength (mn.) | Color Purity (%) |
|---|---|---|---|---|---|---|
| Multilayer Film | 75 | 51 | 40 | 0.62 | 575 | 10.5 |
| Scotchtint® IN50BR Film | 50 | 31 | 58 | 0.39 | 478 | 9.7 |
| Multilayer/ Scotchtint® laminate | 45 | 23 | 67 | 0.29 | 490 | 2.1 |

EXAMPLE 12

(PET:Ecdel, 150, Nickel Scotchtint™ Film)

A coextruded film containing 151 layers was made on a sequential flat-film-making line via a coextrusion process according to Example 1, with skin layers coextruded on the outside of the optical stack with a total thickness of about 14% of the coextruded layers.

This multilayered polymer film was laminated to a Scotchtint® nickel coated film available from 3M Company, St. Paul, Minn., as Scotchtint® Film RE50NEARL, using a 95/5 IOA/acrylamide acrylic pressure sensitive adhesive from 3M Company, St. Paul, Minn., which is commonly used on Scotchtint® films.

Two samples were prepared consisting of Scotchtint® Film RE50NEARL adhered to ¼ inch clear glass using 95/5 IOA/acrylamide acrylic PSA, and multilayer IR film adhered to ¼ inch clear glass and subsequently applied to Scotchtint® RE50NEARC Film using the 95/5 IOA/acrylamide acrylic PSA to form a multilayer IR film/Scotchtint® Film laminate, and these samples were compared to the multilayered IR film adhered to ¼ inch clear glass sample of Example 11. The samples were characterized by measuring their optical spectra reflection in a Perkin Elmer λ-9 as described in Example 10.

The results of the optical characterization are shown in Table III below. The visible transmitted intensity for the multilayered polymer film is better than the and the Scotchtint® RE50NEARC Film, 75% versus 51%, and the multilayer film/Scotchtint® laminate is only slightly worse at 44%, but there is a significant improvement in shading coefficient at 0.45 for the laminate compared to 0.62 and 0.64 for the multilayer film and Scotchtint® film, respectively.

TABLE II

| Sample | $T_{lum}$ (%) | $T_{AM2}$ (%) | $R_{AM2}$ (%) | Shading Co-efficient | Dominant Wavelength (mn.) | Color Purity (%) |
|---|---|---|---|---|---|---|
| Multilayer Film | 75 | 51 | 40 | 0.62 | 575 | 10.5 |
| Scotchtint® RE50NEARC Film | 51 | 43 | 12 | 0.64 | 482 | 2.2 |
| Multilayer/ Scotchtint® laminate | 44 | 28 | 33 | 0.45 | 570 | 9.5 |

Other modifications and variations of the present invention are possible in light of the above teachings. For example, UV absorbers and other modifying agents may be added to one or more of the layers of the multilayered polymer film used in the present invention. It is to be understood, however, that changes may be made in the particular embodiments described above which are within the full intended scope of the invention as defined in the appended claims.

What is claimed is:

1. A transparent multilayer device which reflects light in the infrared region of the spectrum and transmits light in the visible region of the spectrum, comprising:
   a birefringent polymer film comprising a plurality of layers wherein at least one of the layers comprises a first birefringent polymeric material and at least one of the layers comprises a second polymeric material, the first and second polymeric materials having a refractive index difference of less than 0.05 along a first axis orthogonal to a plane of the film, and having a refractive index difference of at least 0.05 along a second axis perpendicular to the first axis; and
   a transparent conductor having at least one layer containing a metal or metal compound.

2. The device of claim 1 wherein the metal or metal compound is selected from the group consisting of silver, gold, copper, aluminum, doped tin oxide, undoped tin dioxide, zinc oxide, and indium tin oxide.

3. The device of claim 1 wherein the transparent conductor comprises at least one layer containing silver or a silver alloy.

4. The device of claim 1 wherein the transparent conductor comprises at least one layer containing indium tin oxide.

5. The device of claim 1 wherein the layer containing a metal or a metal compound comprises a metalized polymer or glass sheet that is laminated to the multilayered polymer film.

6. The device of claim 1, wherein the first polymeric material is a semi-crystalline polyester.

7. The device of claim 1 wherein the device is a mirror.

8. The device of claim 1 wherein the device is a polarizer.

9. An article comprising the device of claim 1 applied to a surface of a glass or plastic substrate.

10. A window construction, comprising the article of claim 1.

11. The article of claim 9 wherein the substrate is an exterior window of a building or a windshield or window of an automobile, truck, or aircraft.

12. The article of claim 9 applied to a window of a house or automobile, wherein the transparent conductor is next to an interior surface of the window and the film faces the house or automobile interior.

13. A reflective article, comprising:
   a birefringent multilayer film including a first birefringent polymer layer and a second polymer layer contiguous to the first layer; and
   a transparent conductor having at least one layer containing a metal or metal compound;

wherein the first and second polymer layers have refractive indices $n_{1z}$, $n_{2z}$ respectively for light polarized along a first axis perpendicular to a plane of the multilayer film;

wherein the first and second polymer layers have refractive indices $n_{1x}$, $n_{2x}$ respectively for light polarized along a second axis perpendicular to the first axis; and wherein $n_{1x}$ is greater than $n_{2x}$, and wherein $n_{1z}$ is less than or equal to $n_{2z}$.

14. A reflective article, comprising:

a birefringent multilayer film including a first birefringent polymer layer and a second polymer layer contiguous to the first layer; and a transparent conductor having at least one layer containing a metal or metal compound;

wherein the first and second polymer layers have refractive indices $n_{1z}$, $n_{2z}$ respectively for light polarized along a first axis perpendicular to a plane of the multilayer film;

wherein the first and second polymer layers have refractive indices $n_{1x}$, $n_{2x}$ respectively for light polarized along a second axis perpendicular to the first axis; and wherein $n_{1x}$ and $n_{2x}$ differ by an amount $\Delta n_x$ to provide a reflective interface between the first and second layer, wherein $n_{1z}$ and $n_{2z}$ differ by an amount $\Delta n_z$, and wherein a ratio $\Delta n_z/\Delta n_x$ is less than 0.5.

15. A reflective article, comprising:

a birefringent multilayer film including a first birefringent polymer layer and a second polymer layer contiguous to the first layer; and a transparent conductor having at least one layer containing a metal or metal compound;

wherein the first and second polymer layers have refractive indices selected to provide a reflective interface therebetween whose reflectivity for p-polarized light has a property selected from the group of decreasing slowly with angle of incidence, being independent of angle of incidence, and increasing with angle of incidence.

* * * * *

UNITED STATES PATENT AND TRADEMARK OFFICE
CERTIFICATE OF CORRECTION

PATENT NO.    : 6,565,982 B1
DATED         : May 20, 2003
INVENTOR(S)   : Ouderkirk, Andrew J.

It is certified that error appears in the above-identified patent and that said Letters Patent is hereby corrected as shown below:

Title page,
Item [56], References Cited, U.S. PATENT DOCUMENTS, "5,422,756" reference, delete "Weler" and insert -- Weber --, therefore; and "5,451,449" reference, delete "Ramakrishna et al." and insert -- Shetty et al. --, therefore.
OTHER PUBLICATIONS, delete "Multilayers with Wide Transmission Band" and insert -- "Multilayer Filters with Wide Transmission Bands", Thelen --, therefore.

Column 7,
Line 54, delete "Theological" and insert -- rheological --, therefore.

Column 8,
Line 37, insert -- e.g., -- before "copolymers".

Column 13,
Line 22, delete "filing" and insert -- film --, therefore.

Column 14,
Line 2, delete "nx=ny nz" and insert -- $n_x = n_y \neq n_z$ --, therefore.
Line 23, delete "nx ny nz" and insert -- $n_x \neq n_y \neq n_z$ --, therefore.

Column 15,
Line 14, delete "inade" and insert -- made --, therefore.
Line 29, delete "nx=ny nz" and insert -- $n_x = n_y \neq n_z$ - -, therefore.

Column 16,
Line 13, delete "(n1z>n2z)" and insert -- $(n1z^3\ n2z)$ --, therefore.
Line 44, delete "nix" and insert -- n1x --, therefore.

Column 19
Line 14, (Approx.), delete "minor" and insert -- mirror --, therefore.

Column 20
Line 62, delete "($\Delta$nz=0.11)" and insert -- (Dnz = 0.11) --, therefore.

Column 21,
Line 20, delete "n1y$\neq$n2y" and insert -- $nly^1 n2y$ --, therefore.
Line 21, delete "they" and insert -- the --, therefore.
Line 49, delete "($\Delta$nz=0.04)" and insert -- (Dnz = 0.04) --, therefore.
Line 66, Delete "$\Delta$nz and Any" and insert -- Dnz and Dny --, therefore.

UNITED STATES PATENT AND TRADEMARK OFFICE
CERTIFICATE OF CORRECTION

PATENT NO.    : 6,565,982 B1
DATED         : May 20, 2003
INVENTOR(S)   : Ouderkirk, Andrew J.

It is certified that error appears in the above-identified patent and that said Letters Patent is hereby corrected as shown below:

Column 26,
Lines 35-36 (Approx.), delete "Ecdel 9966 (a thermoplastic elastomer available from Eastman Chemical)" and insert -- a thermoplastic elastomer available from Eastman Chemical under the trade designation "Ecdel 9966 --, therefore.

Column 27,
Lines 3-4, delete "Ecdel 9966 (a thermoplastic elastomer available from Eastman Chemical)" and insert -- a thermoplastic elastomer available from Eastman Chemical under the trade designation "Ecdel 9966" --, therefore.
Lines 64-65, delete "THV 500 (a fluoropolymer available from Minnesota Mining and Manufacturing Company)" and insert -- a fluoropolymer available from Minnesota Mining and Manufacturing Company under the trade designation "THV 500" --, therefore.

Column 30,
Lines 12-13, delete "Ecdel 9967 (a thermoplastic elastomer available from Eastman Chemical)" and insert -- a thermoplastic elastomer available from Eastman Chemical under the trade designation "Ecdel 9967" --, therefore.
Lines 46-47, delete "(PCTG 5445 from Eastman Chemical)" and insert -- available from Eastman Chemical under the trade designation "PCTG 5445" --, therefore.

Column 31,
Lines 18-19, delete "Ecdel 9966 (a thermoplastic elastomer available from Eastman Chemical)" and insert -- a thermoplastic elastomer available from Eastman Chemical under the trade designation "Ecdel 9966" --, therefore.

Column 32,
Line 41, delete "Silver Scotchtint® Film" and insert -- Silver-Coated Film Under the Trade Designation "Scotchtint" --, therefore.
Line 49, (Approx.), delete "Scotchtint®" before "silver".
Line 66, after "than the" delete "and the".

UNITED STATES PATENT AND TRADEMARK OFFICE
CERTIFICATE OF CORRECTION

PATENT NO. : 6,565,982 B1
DATED : May 20, 2003
INVENTOR(S) : Ouderkirk, Andrew J.

It is certified that error appears in the above-identified patent and that said Letters Patent is hereby corrected as shown below:

Column 33,
Line 24, delete "Nickel Scotchtint.™ Film" and insert -- Nickel-Coated Film Under the Trade Designation "Scotchtint" --, therefore.
Line 32, Delete "Scotchtint®" before "nickel".
Line 50 (Approx.), after "than the" delete "and the".
Line 58 (Approx.), delete "TABLE II" and insert -- TABLE III --, therefore.

Signed and Sealed this

Fourteenth Day of September, 2004

JON W. DUDAS
*Director of the United States Patent and Trademark Office*